US009640840B2

(12) United States Patent
Nakatsutsumi et al.

(10) Patent No.: US 9,640,840 B2
(45) Date of Patent: May 2, 2017

(54) SODIUM SECONDARY BATTERY

(71) Applicant: Panasonic Intellectual Property Management Co., Ltd., Osaka (JP)

(72) Inventors: Takayuki Nakatsutsumi, Osaka (JP); Nobuhiko Hojo, Osaka (JP); Hirotetsu Suzuki, Osaka (JP); Yu Otsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 14/553,089

(22) Filed: Nov. 25, 2014

(65) Prior Publication Data

US 2015/0155601 A1 Jun. 4, 2015

(30) Foreign Application Priority Data

Dec. 4, 2013 (JP) ................................ 2013-250992
Feb. 27, 2014 (JP) ................................ 2014-036600

(51) Int. Cl.
*H01M 10/05* (2010.01)
*H01M 10/0569* (2010.01)
(Continued)

(52) U.S. Cl.
CPC ....... *H01M 10/0569* (2013.01); *H01M 4/483* (2013.01); *H01M 4/587* (2013.01);
(Continued)

(58) Field of Classification Search
None
See application file for complete search history.

(56) References Cited

U.S. PATENT DOCUMENTS

2010/0119956 A1 5/2010 Tokuda et al.
2012/0015256 A1 1/2012 Komaba et al.
(Continued)

FOREIGN PATENT DOCUMENTS

CN 103348511 10/2013
EP 2763231 8/2014
(Continued)

OTHER PUBLICATIONS

English Translation of Chinese Search Report dated Jul. 19, 2016 for the related Chinese Patent Application No. 201410664355.0.

*Primary Examiner* — Scott J Chmielecki
(74) *Attorney, Agent, or Firm* — McDermott Will & Emery LLP

(57) ABSTRACT

A sodium secondary battery includes a positive electrode, a negative electrode, and a non-aqueous electrolytic solution including a non-aqueous solvent. The non-aqueous solvent includes a fluoro group-containing chain carboxylic acid ester represented by General Formula (1):

(1)

O
$R_1$ O $R_2$ $R_3$ $R_4$ wherein $R_1$ is an aromatic group, an unsaturated aliphatic group or a saturated aliphatic group; $R_2$, $R_3$ and $R_4$ are each a hydrogen atom, an aromatic group, an unsaturated aliphatic group or a saturated aliphatic group; and at least one of $R_1$, $R_2$, $R_3$ and $R_4$ includes one or more fluoro groups.

15 Claims, 11 Drawing Sheets

100
20
2a 2b
4
5
1a 1b 30
10

(51) Int. Cl.

*H01M 4/48* (2010.01)
*H01M 4/587* (2010.01)
*H01M 10/054* (2010.01)
*H01M 10/0568* (2010.01)

(52) U.S. Cl.

CPC ...... *H01M 10/054* (2013.01); *H01M 10/0568* (2013.01); *H01M 2300/0034* (2013.01); *H01M 2300/0037* (2013.01)

(56) References Cited

U.S. PATENT DOCUMENTS

| | | | | |
|---|---|---|---|---|
| 2013/0323590 | A1 | 12/2013 | Kageura | |
| 2015/0064574 | A1* | 3/2015 | He | H01M 10/0568 429/300 |
| 2015/0180024 | A1* | 6/2015 | Nose | C01B 25/45 429/220 |
| 2015/0333326 | A1* | 11/2015 | Lee | H01M 4/366 429/225 |

FOREIGN PATENT DOCUMENTS

| | | |
|---|---|---|
| JP | 2004-342607 | 12/2004 |
| JP | 2005-135906 | 5/2005 |
| JP | 2007-287661 | 11/2007 |
| JP | 2008-277000 | 11/2008 |
| JP | 2010-027538 | 2/2010 |
| JP | 2010-165674 | 7/2010 |
| JP | 2011-049126 | 3/2011 |
| JP | 2012-064472 | 3/2012 |
| JP | 2013-048077 | 3/2013 |
| JP | 2013-125696 | 6/2013 |
| JP | 2013-168241 | 8/2013 |
| JP | 2013-243010 | 12/2013 |
| JP | 2014-503964 | 2/2014 |
| WO | 2008/126800 | 10/2008 |
| WO | 2010/109889 | 9/2010 |
| WO | 2011/024837 | 3/2011 |
| WO | 2012/082760 | 6/2012 |
| WO | 2013/047342 | 4/2013 |
| WO | 2013/171991 | 11/2013 |
| WO | 2013/187160 | 12/2013 |

* cited by examiner

SODIUM SECONDARY BATTERY

CROSS REFERENCES TO RELATED APPLICATIONS

This application claims priority to Japanese Patent Application No. 2013-250992 filed on Dec. 4, 2013, and Japanese Patent Application No. 2014-036600 filled on Feb. 27, 2014, the contents of which are hereby incorporated by reference.

BACKGROUND

1. Technical Field

The present disclosure relates to sodium secondary batteries.

2. Description of the Related Art

The abundant resource of sodium metal makes sodium secondary batteries attractive as next-generation batteries to replace lithium secondary batteries. Sodium secondary batteries are still on the way of development. For example, sodium secondary batteries compare unfavorably to lithium secondary batteries in terms of energy density. It is therefore demanded that the energy density of sodium secondary batteries be enhanced.

N Yabuuchi, et al. (*Nature Materials* 11, 512-517, 2012) discloses that a sodium secondary battery containing P2-type $Na_x[Fe_{1/2}Mn_{1/2}]O_2$ as a positive electrode active material realizes a capacity density of 190 mAh/g.

International Publication No. WO 2010/109889 discloses saturated cyclic ester carbonates and mixtures of saturated cyclic ester carbonates with saturated chain ester carbonates for use as non-aqueous solvents in non-aqueous electrolytic solutions for sodium secondary batteries.

Japanese Unexamined Patent Application Publication No. 2010-165674 discloses electrolytic solutions which include organic solvents having nitrile groups.

SUMMARY

A stable charge/discharge performance of sodium secondary batteries is desired. The present disclosure provides sodium secondary batteries that can be charged and discharged stably.

A sodium secondary battery according to an aspect of the present disclosure includes: a positive electrode including a positive electrode active material allowing a sodium ion to be inserted therein and released therefrom; a negative electrode including a negative electrode active material allowing a sodium ion to be inserted therein and released therefrom; and a non-aqueous electrolytic solution including a non-aqueous solvent and a sodium salt dissolved in the non-aqueous solvent, the non-aqueous solvent including a fluoro group-containing chain carboxylic acid ester represented by General Formula (1):

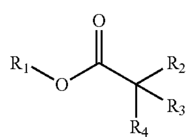

(1)

wherein $R_1$ is an aromatic group, an unsaturated aliphatic group or a saturated aliphatic group; $R_2$, $R_3$ and $R_4$ are each a hydrogen atom, an aromatic group, an unsaturated aliphatic group or a saturated aliphatic group; and at least one of $R_1$, $R_2$, $R_3$ and $R_4$ includes one or more fluoro groups.

With the above configuration, the sodium secondary battery can be charged and discharged stably.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

Figure 1:
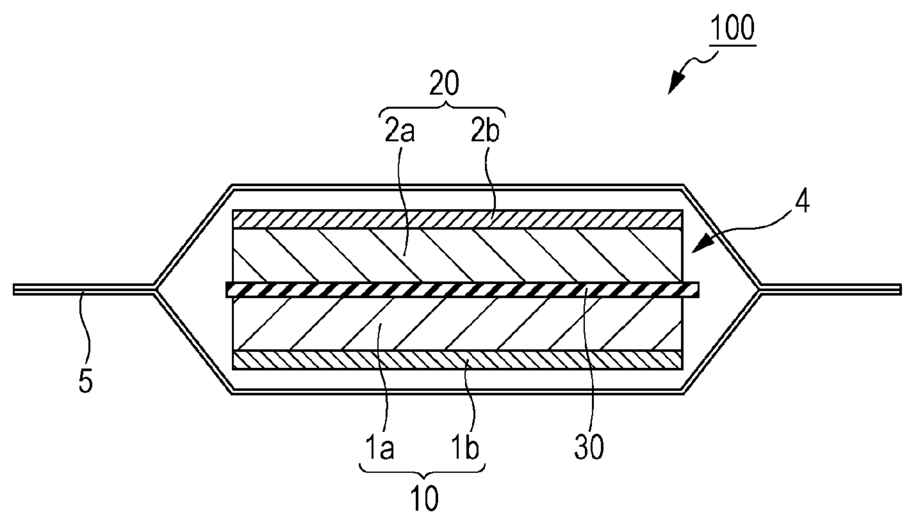
FIG. 1 is a schematic sectional view illustrating an exemplary configuration of a sodium secondary battery.

DETAILED DESCRIPTION (Underlying Knowledge Forming Basis of the Present Disclosure)

Before the illustration of embodiments of the present disclosure, underlying knowledge forming basis of the present disclosure will be described. The following description only serves to help understanding of embodiments, and should not be construed as limiting the scope of the present disclosure.

Various positive electrode materials have been reported in order to enhance the energy density of sodium secondary batteries. For example, N Yabuuchi, et al (*Nature Materials* 11, 512-517, 2012) discloses a sodium secondary battery which realizes a capacity density of 190 mAh/g when charged up to 4.2 V based on Na.

The standard electrode potential of sodium is −2.714 V and is slightly more noble than the standard electrode potential of lithium (−3.045 V). In consideration of these standard electrode potentials, a charging potential of 4.2 V based on Na corresponds to a charging potential of 4.5 V or more based on Li. This charging potential is likely to cause the oxidative decomposition of organic solvents such as carbonates in lithium secondary batteries. Thus, a problem is encountered in which sodium secondary batteries are likely to fail due to the oxidative decomposition of solvents when the batteries are charged until the positive electrode potential reaches a high potential.

In addition, the options of solvents for electrolytic solutions in sodium secondary batteries are limited for reasons such as low solubility of sodium salts in solvents compared to lithium salts, and high reactivity with some kinds of negative electrodes.

The electrolytic solutions disclosed in Japanese Unexamined Patent Application Publication No. 2010-165674 contain organic solvents having nitrile groups and thereby achieve some improvements in resistance against oxidation. The organic solvents such as cyclic ester carbonates and chain ester carbonates, however, may be oxidatively decomposed under high potential. Thus, there is a risk that the sodium secondary batteries including the organic solvents fail when the potential of the positive electrode reaches a high potential during charging. Further, the electrolytic solutions disclosed in the publication are unsatisfactory in terms of the resistance against reduction on negative electrodes.

Extensive studies have been made to evaluate the oxidation resistance and the reliability on negative electrodes of non-aqueous electrolytic solutions for sodium secondary batteries, resulting in the following findings.

(a) Non-aqueous electrolytic solutions for sodium secondary batteries achieve excellent oxidation resistance when they contain a non-aqueous solvent that includes a fluoro group-containing carboxylic acid ester.

(b) Non-aqueous electrolytic solutions for sodium secondary batteries achieve excellent oxidation resistance when they contain a non-aqueous solvent that includes not less than 30 wt % of a fluoro group-containing ester carbonate.

(c) Non-aqueous electrolytic solutions for sodium secondary batteries suppress the deposition of sodium metal on negative electrodes when they contain a non-aqueous solvent including a fluoro group-containing chain carboxylic acid ester or a fluoro group-containing chain ester carbonate.

Various aspects in an embodiment and a reference embodiment described hereinbelow are based on at least one of the above findings. However, the embodiment discussed below is not limited by the above knowledge.

(Overview of Embodiment)

A sodium secondary battery according to a first aspect of the present disclosure includes: a positive electrode including a positive electrode active material allowing a sodium ion to be inserted therein and released therefrom; a negative electrode including a negative electrode active material allowing a sodium ion to be inserted therein and released therefrom; and a non-aqueous electrolytic solution including a non-aqueous solvent and a sodium salt dissolved in the non-aqueous solvent, the non-aqueous solvent including a fluoro group-containing chain carboxylic acid ester represented by General Formula (1):

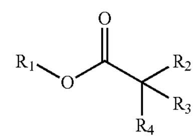

(1)

wherein $R_1$ is an aromatic group, an unsaturated aliphatic group or a saturated aliphatic group; $R_2$, $R_3$ and $R_4$ are each a hydrogen atom, an aromatic group, an unsaturated aliphatic group or a saturated aliphatic group; and at least one of $R_1$, $R_2$, $R_3$ and $R_4$ includes one or more fluoro groups.

The fluoro group-containing chain carboxylic acid esters have excellent oxidation resistance and can suppress the deposition of sodium metal on the negative electrodes. Thus, the safety and the reliability of the sodium secondary batteries can be enhanced.

A sodium secondary battery according to a second aspect of the present disclosure may be such that, for example, the chain carboxylic acid ester in the first aspect is at least one selected from the group consisting of fluoromethyl acetate, difluoromethyl acetate, trifluoromethyl acetate, methyl 3-fluoropropionate, methyl 3,3-difluoropropionate, methyl 3,3,3-trifluoropropionate, methyl 3-fluoro-2-methylpropionate, methyl 3,3-difluoro-2-methylpropionate, methyl 3,3,3-trifluoro-2-methylpropionate, methyl 3,3,3-trifluoro-2,2-dimethylpropionate, fluoromethyl propionate, difluoromethyl propionate, trifluoromethyl propionate, fluoromethyl 3-fluoropropionate, trifluoromethyl 3,3,3-trifluoropropionate, 2-fluoroethyl acetate, 2,2-difluoroethyl acetate, 2,2,2-trifluoroethyl acetate, 1-fluoroethyl acetate, 1,1-difluoroethyl acetate, 1,1,2,2,2-pentafluoroethyl acetate, 2-fluoroethyl propionate, 2,2-difluoroethyl propionate, 2,2,2-trifluoroethyl propionate, 1-fluoroethyl propionate, 1,1-difluoroethyl propionate, 1,1,2,2,2-pentafluoroethyl propionate, ethyl 3-fluoropropionate, ethyl 3,3-difluoropropionate, ethyl 3,3,3-trifluoropropionate, 2,2,2-trifluoroethyl 3,3,3-trifluoropropionate, 1,1,2,2,2-pentafluoroethyl 3,3,3-trifluoropropionate and 2-fluoroethyl 3-fluoropropionate.

In a third aspect of the present disclosure, for example, the chain carboxylic acid ester in the first aspect may be at least one selected from the group consisting of 2,2,2-trifluoroethyl acetate and methyl 3,3,3-trifluoropropionate. With this configuration, for example, viscosity and oxidation resistance of the non-aqueous electrolytic solution can be enhanced.

In a fourth aspect of the present disclosure, for example, the non-aqueous solvent in any one of the first to the third aspect may include the fluoro group-containing chain carboxylic acid ester in a volume fraction of not less than 30% of the non-aqueous solvent. With this configuration, the deposition of sodium metal on the negative electrodes can be suppressed efficiently, enabling the safety and the reliability of the sodium secondary batteries to be enhanced.

In a fifth aspect of the present disclosure, for example, the non-aqueous solvent in any one of the first to the third aspect may include the fluoro group-containing chain carboxylic acid ester in a volume fraction of not less than 50% of the non-aqueous solvent. With this configuration, the deposition of sodium metal on the negative electrodes can be suppressed efficiently, thus enabling the safety and the reliability of the sodium secondary batteries to be enhanced.

In a sixth aspect of the present disclosure, for example, the non-aqueous solvent in any one of the first to the fifth aspect may further include an ester carbonate. In a seventh aspect of the present disclosure, for example, the ester carbonate in the sixth aspect may be a cyclic ester carbonate. When the non-aqueous electrolytic solution contains an ester carbonate, in particular, a cyclic ester carbonate, the degree of the dissociation of the sodium salt in the non-aqueous electrolytic solution can be increased.

In an eighth aspect of the present disclosure, for example, the cyclic ester carbonate in the seventh aspect may be a fluoroethylene carbonate. With this configuration, the resistance against oxidation of the non-aqueous electrolytic solution can be enhanced.

In a ninth aspect of the present disclosure, for example, the sodium salt in any one of the first to the eighth aspect may be at least one selected from the group consisting of $NaBF_4$, $NaPF_6$, $NaN(SO_2CF_3)_2$ and $NaN(SO_2F)_2$. With this configuration, for example, ion conductivity of the non-aqueous electrolytic solution can be enhanced.

In a tenth aspect of the present disclosure, for example, the negative electrode active material in any one of the first to the ninth aspect may be a metal oxide. In an eleventh aspect of the present disclosure, for example, the metal oxide in the tenth aspect may be titanium oxide. In a twelfth aspect of the present disclosure, for example, the negative electrode active material in any one of the first to the ninth aspect may be carbon. In a thirteenth aspect of the present disclosure, for example, the carbon in the twelfth aspect may be amorphous carbon. When the negative electrode active material is a metal oxide or carbon, the deposition of sodium metal on the negative electrode can be suppressed without any degradation of the negative electrode by the fluoro group-containing chain carboxylic acid ester.

In a fourteenth aspect of the present disclosure, for example, the sodium secondary battery in any one of the first to the thirteenth aspect may be such that the potential of the positive electrode versus sodium reaches 3.9 V or more metal during charging of the sodium secondary battery. With this configuration, the oxidative decomposition of the non-aqueous electrolytic solution can be suppressed even when the positive electrode potential reaches a high potential during charging. Consequently, the capacity of the sodium secondary batteries can be enhanced.

Hereinbelow, an embodiment of the present disclosure will be described in detail. The embodiment discussed below illustrates comprehensive or specific examples. The configurations described in the following embodiment such as compositions, values, shapes, materials, constituent elements, connections of the constituent elements, and arrangements thereof are only illustrative and do not limit the scope of the present disclosure. Of the constituent elements in the following embodiment, those that are not described in the independent claim representing the broadest concept are illustrated as optional constituent elements.

(Embodiment)

Hereinbelow, specific examples of sodium secondary batteries according to the present embodiment will be described with reference to the drawings.

[Configurations of Sodium Secondary Batteries]

Figure 2:
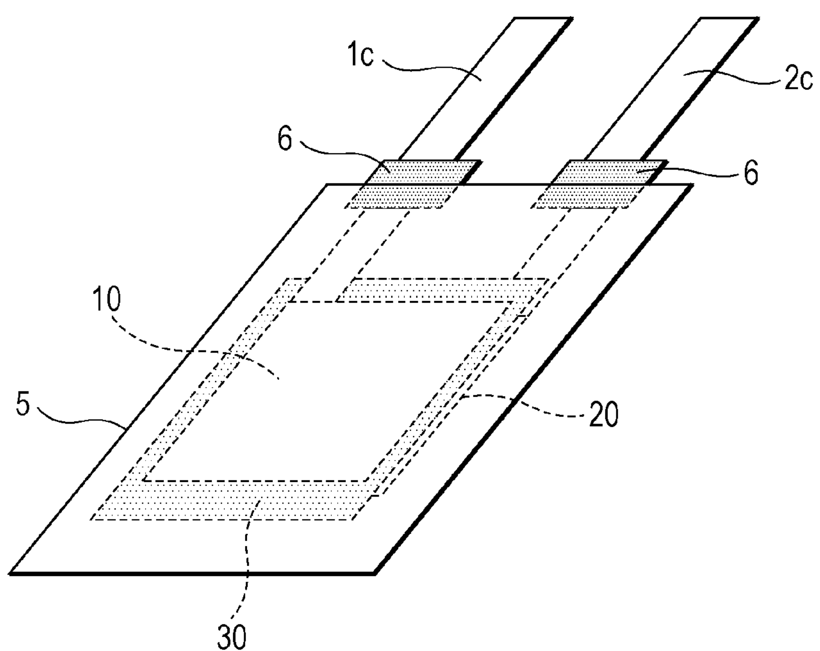
FIG. 2 is a perspective view of the sodium secondary battery illustrated in FIG. 1.

As illustrated in FIGS. 1 and 2, a sodium secondary battery 100 includes an electrode assembly 4 and a package 5. The electrode assembly 4 is housed in the package 5. The electrode assembly 4 has a positive electrode 10, a negative electrode 20 and a separator 30. The positive electrode 10 includes a positive electrode current collector 1*b* and a positive electrode material mixture layer 1*a*. The positive electrode material mixture layer 1*a* is disposed on the positive electrode current collector 1*b*. The negative electrode 20 includes a negative electrode current collector 2*b* and a negative electrode material mixture layer 2*a*. The negative electrode material mixture layer 2*a* is disposed on the negative electrode current collector 2*b*. The positive electrode 10 and the negative electrode 20 are opposed to each other via the separator 30, thereby forming the electrode assembly 4. The electrode assembly 4 is impregnated with a non-aqueous electrolytic solution (not shown). A positive electrode tab lead 1*c* is connected to the positive electrode current collector 1*b*, and a negative electrode tab lead 2*c* is connected to the negative electrode current collector 2*b*. Both the positive electrode tab lead 1*c* and the negative electrode tab lead 2*c* extend to the outside of the package 5. An insulating tab film 6 is disposed between the positive electrode tab lead 1*c* and the package 5. Another insulating tab film 6 is disposed between the negative electrode tab lead 2*c* and the package 5.

The positive electrode material mixture layer 1*a* includes a positive electrode active material capable of allowing a sodium ion to be inserted therein and released therefrom. The positive electrode material mixture layer 1*a* may include a conductive auxiliary agent, an ionic conductor and a binder as required. The positive electrode active material, the conductive auxiliary agent, the ionic conductor and the binder may be any of known materials without limitation.

The positive electrode active materials are not particularly limited as long as the materials are capable of allowing one or more sodium ions to be inserted therein and released therefrom. Examples of the positive electrode active materials include sodium-containing transition metal oxides, transition metal fluorides, polyanion materials, fluorinated polyanion materials and transition metal sulfides. Examples of the sodium-containing transition metal oxides include $Na_xMe^1_yO_2$, where x is a real number satisfying $0<x\leq 1$, y is a real number satisfying $0.95\leq y<1.05$, and $Me^1$ includes at least one selected from the group consisting of Fe, Mn, Ni, Co, Cr and Ti. Examples of the transition metal fluorides include $NaFeF_3$, $NaMnF_3$ and $NaNiF_3$. Examples of the polyanion materials and the fluorinated polyanion materials include $NaMe^2PO_4$, $Na_3Me^2_2(PO_4)_3$, $Na_4Me^2_3(PO_4)_2P_2O_7$, $Na_2Me^2PO_4F$ and $Na_3Me^2_2(PO_4)_2F_3$, where $Me^2$ includes at least one selected from the group consisting of Fe, Mn, Ni, Co, Ti, V and Mo. Examples of the transition metal sulfides include $Ni_3S_2$, $FeS_2$ and $TiS_2$. In particular, when the positive electrode active materials are the sodium-containing transition metal oxides, the sodium secondary battery 100 can be manufactured with low cost and can achieve high average discharge voltage.

The conductive auxiliary agents and the ionic conductors decrease the internal resistance of electrodes. Examples of the conductive auxiliary agents include carbon materials such as carbon black, graphite and acetylene black, and conductive polymers such as polyaniline, polypyrrole and polythiophene. Examples of the ionic conductors include gel electrolytes such as polymethyl methacrylate and polymethacrylic acid methyl, and solid electrolytes such as polyethylene oxide.

The binders enhance the binding properties of the materials constituting the electrodes. Examples of the binders include polyvinylidene fluoride, vinylidene fluoride-hexafluoropropylene copolymer, vinylidene fluoride-tetrafluoroethylene copolymer, polytetrafluoroethylene, carboxymethyl cellulose, polyacrylic acid, styrene-butadiene copolymer rubber, polypropylene, polyethylene and polyimide.

The positive electrode current collector 1*b* may be a sheet or a film made of a metal material. The positive electrode current collector 1*b* may be porous or non-porous. Examples of the metal materials include aluminum, aluminum alloys, stainless steel, titanium and titanium alloys. Aluminum and alloys thereof are inexpensive and are easy to form into thin films. The sheets or films may have forms such as metal foils or metal meshes. A carbon material such as carbon may be applied onto the surface of the positive electrode current collector 1*b* for purposes such as reducing the resistance, imparting a catalytic effect, and increasing the strength of the bonding between the positive electrode material mixture layer 1*a* and the positive electrode current collector 1*b*.

The negative electrode material mixture layer 2*a* includes a negative electrode active material capable of allowing a sodium ion to be inserted therein and released therefrom. The negative electrode material mixture layer 2*a* may include a conductive auxiliary agent, an ionic conductor and a binder as required. The conductive auxiliary agent, the ionic conductor and the binder may be similar to those used in the positive electrode 10.

The negative electrode active materials are not particularly limited as long as the materials are capable of allowing one or more sodium ions to be inserted therein and released therefrom. Examples of the negative electrode active materials include carbons, metal oxides and sulfides. Examples of the carbons include artificial graphite, natural graphite, graphene sheets, non or hard-graphitizable amorphous carbon and graphitizable amorphous carbon. Examples of the metal oxides include titanium oxides such as $Na_2Ti_3O_7$, $Na_2Ti_6O_{13}$, $Li_4Ti_5O_{12}$ and $TiO_2$, and tin oxides such as SnO. Examples of the sulfides include $WS_2$.

As will be described later, non-aqueous solvents may have properties of dissolving sodium metal. The negative electrode active materials capable of intercalating or de-intercalating one or more sodium ions are free from sodium metal. Accordingly, the negative electrode active materials function stably without being dissolved even in the case where the non-aqueous solvent has properties of dissolving sodium metal. The negative electrode active materials may be sodium-containing materials, for example, sodium alloys as long as the materials are not dissolved in the non-aqueous solvent. Specifically, examples of the elements for forming such sodium alloys include Zn, Ga, Ge, Se, Pd, Cd, In, Sn, Sb, Te, Cs, Ba, Pt, Au, Hg, Tl, Pb and Bi.

The negative electrode current collector 2*b* may be a sheet or a film made of a metal material. The negative electrode current collector 2*b* may be porous or non-porous. Examples of the metal materials include aluminum, aluminum alloys, stainless steel, nickel, nickel alloys, copper and copper alloys. Aluminum and alloys thereof are inexpensive and are easy to form into thin films. The sheets or films may have forms such as metal foils or metal meshes. A carbon material such as carbon may be applied onto the surface of the negative electrode current collector 2*b* for purposes such as reducing the resistance, imparting a catalytic effect, and increasing the strength of the bonding between the negative electrode material mixture layer 2*a* and the negative electrode current collector 2*b*.

The separator 30 may be a porous membrane made of, for example, polyethylene, polypropylene, glass, cellulose or ceramic. The inside of the pores of the separator 30 is impregnated with the non-aqueous electrolytic solution.

Examples of the types (shapes) of the sodium secondary batteries include sheet types illustrated in FIGS. 1 and 2, coin types, button types, laminate types, cylindrical types, flat types and prismatic types. The non-aqueous electrolytic solution described later may be applied to any types of the sodium secondary batteries. Examples of the applications of the sodium secondary batteries in the present embodiment include, but are not limited to, personal digital assistant, mobile electronic devices, household power storage systems, industrial power storage systems, motorcycles, electric vehicles (EV) and plug-in hybrid electric vehicles (PHEV).

[Non-aqueous Electrolytic Solutions for Sodium Secondary Batteries]

The non-aqueous electrolytic solution for sodium secondary batteries in the present embodiment includes a non-aqueous solvent and a sodium salt dissolved in the non-aqueous solvent. The non-aqueous solvent includes a fluoro group-containing carboxylic acid ester. The fluoro group-containing carboxylic acid ester includes a chain carboxylic acid ester represented by General Formula (2) below:

(2)

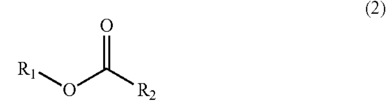

In Formula (2), $R_1$ and $R_2$ are each an aromatic group, an unsaturated aliphatic group or a saturated aliphatic group. $R_1$ and $R_2$ may be the same or different from each other. At least one of $R_1$ and $R_2$ includes at least one fluoro group. The number of carbon atoms in each of $R_1$ and $R_2$ in Formula (2) may be 6 or less, may be 1 to 4, or may be 1 or 2. As the number of carbon atoms in $R_1$ and $R_2$ is smaller, the non-aqueous electrolytic solution can dissolve sodium metal more efficiently, thus enhancing the safety of the sodium secondary batteries.

Typically, sodium ions in an electrolytic solution have a lower charged density than lithium ions. Accordingly, a smaller number of solvent molecules are coordinated to sodium ions than in the case of lithium ions. In an electrolytic solution, the coordination of solvent molecules to lithium ions or sodium ions decreases the charged density of the solvent molecules. This causes the oxidation resistance of the solvent to be enhanced. Since sodium ions allow only a small number of solvent molecules to be coordinated thereto, a non-aqueous electrolytic solution for sodium secondary batteries is easily oxidized and decomposed compared to a non-aqueous electrolytic solution for lithium secondary batteries.

Fluoro group-containing carboxylic acid esters have excellent oxidation resistance even in the absence of coordination to sodium ions. Thus, the non-aqueous electrolytic solution for sodium secondary batteries which includes a fluoro group-containing carboxylic acid ester can exhibit excellent oxidation resistance on a positive electrode, even when the electrode potential reaches a high potential during charging. Consequently, the sodium secondary battery containing the non-aqueous electrolytic solution can be operated stably.

Although not necessarily clear, the following is assumed to be the mechanism by which the fluoro group-containing carboxylic acid ester exhibits excellent oxidation resistance. When an electron-withdrawing fluoro group is introduced into the carboxylic acid ester skeleton, the HOMO (highest occupied molecular orbital) energy of the carboxylic acid ester is decreased. This is probably why the oxidation resistance of the carboxylic acid ester is increased. The non-aqueous electrolytic solution containing the fluoro group-containing carboxylic acid ester shows higher oxidation resistance in accordance with the content of the ester.

Fluoro group-containing chain carboxylic acid esters are stable to carbon negative electrodes or oxide negative electrodes, even when the potentials of these electrodes reach almost the same negative potential during charging as in the case of sodium metal electrode. This stability is probably ascribed to the formation of passive state films on these electrodes. The reason why the carboxylic acid esters may form passive state films is not clear, but is assumed to be because the processes and the speeds of reductive decomposition of solvents vary depending on the types of electrode materials.

The non-aqueous electrolytic solution including a fluoro group-containing chain carboxylic acid ester can enhance the safety of sodium secondary batteries. The reasons for this will be described below.

In sodium secondary batteries, sodium metal is sometimes deposited on the surface of a negative electrode during overcharging. The sodium metal that has been deposited may penetrate a separator and reach a positive electrode, possibly causing an internal short circuit. The internal short circuit may cause a large current to be passed therethrough, and thereby a large amount of Joule heat may be generated. Thus, the safety of sodium secondary batteries may be lowered.

The non-aqueous electrolytic solution including a fluoro group-containing chain carboxylic acid ester may suppress the deposition of sodium metal on negative electrodes. Specifically, sodium metal is dissolved by the reaction with the fluoro group-containing chain carboxylic acid ester. This can prevent the occurrence of an internal short circuit in the sodium secondary battery. In order to enhance the safety of the sodium secondary batteries, the non-aqueous electrolytic solution may include a low-molecular weight chain carboxylic acid ester, in other words, a chain carboxylic acid ester with a small number of carbon atoms.

The fluoro group-containing chain carboxylic acid esters dissolve sodium metal deposited on the negative electrodes probably because of the following actions.

First, it is probable that the fluoro group-containing chain carboxylic acid esters are easily reductively decomposed because of having a fluoro group. As compared to chain carboxylic acid esters having no fluoro groups, the fluoro group-containing chain carboxylic acid esters have a lower LUMO level. In addition, anions, produced by the decomposition of the fluoro group-containing chain carboxylic acid esters, are stabilized by their own electron-withdrawing fluoro groups. As a result, the fluoro group-containing chain carboxylic acid esters are more likely to be reduced and decomposed, thus causing sodium metal easily to be dissolved.

Secondly, it is probable that the fluoro group-containing chain carboxylic acid esters are, because of their own chain structures, less likely to form passive state films which inhibit the dissolution of sodium metal. Both the fluoro group-containing chain carboxylic acid esters and fluoro group-containing cyclic carboxylic acid esters will form passive state films on negative electrodes which contain a negative electrode active material capable of allowing sodium ions to be inserted therein and released therefrom. However, the fluoro group-containing chain carboxylic acid esters have a lower tendency of forming passive state films than the fluoro group-containing cyclic carboxylic acid esters. Consequently, the fluoro group-containing chain carboxylic acid esters may dissolve sodium metal, if any deposited on the negative electrodes, without covering the sodium metal with the passive state films. The difference in the tendency of forming passive state films is probably ascribed to the following difference. The fluoro group-containing cyclic carboxylic acid esters are ring-opened by reductive decomposition. On the other hand, the fluoro group-containing chain carboxylic acid esters are split by the reductive decomposition into a low-molecular weight anion and a low-molecular weight radical. That is, the decomposition products of the fluoro group-containing chain carboxylic acid ester have lower molecular weights than the decomposition product of the fluoro group-containing cyclic carboxylic acid ester. This is probably the reason why the fluoro group-containing chain carboxylic acid esters hardly form passive state films having a high molecular weight.

Probably for the reasons described above, the fluoro group-containing chain carboxylic acid esters can dissolve sodium metal more easily than fluoro group-containing cyclic carboxylic acid esters or fluoro-free chain carboxylic acid esters.

In order to obtain a high effect in enhancing the safety of the sodium secondary batteries, the content of the chain carboxylic acid ester may be not less than 30%, and further not less than 50% of the non-aqueous solvent.

The chain carboxylic acid esters can exhibit a higher capability of dissolving sodium metal with increasing number of fluoro groups. This is because, as the number of fluoro groups contained in the esters increases, the LUMO level thereof is lowered and the ester is reductively decomposed more easily.

In the present embodiment, the negative electrode active material is a material capable of allowing sodium ions to be inserted therein and released therefrom. Thus, the fluoro group-containing chain carboxylic acid esters can dissolve sodium metal without causing a degradation of the negative electrode active material.

The chain carboxylic acid esters have a lower viscosity than cyclic carboxylic acid esters. Thus, the non-aqueous electrolytic solution may attain a low viscosity by containing the chain carboxylic acid ester. This enables the low-temperature properties of the sodium secondary batteries to be enhanced, and the internal resistance to be reduced.

The fluoro group-containing chain carboxylic acid ester may be a chain carboxylic acid ester represented by General Formula (1) below:

(1)

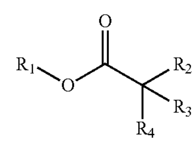

In Formula (1), $R_1$ is an aromatic group, an unsaturated aliphatic group or a saturated aliphatic group; $R_2$, $R_3$ and $R_4$ are each a hydrogen atom, an aromatic group, an unsaturated aliphatic group or a saturated aliphatic group; and at least one of $R_1$, $R_2$, $R_3$ and $R_4$ includes one or more fluoro groups. The number of carbon atoms in $R_1$ in Formula (1) may be 6 or less, may be 1 to 4, or may be 1 or 2. The total number of carbon atoms in $R_2$, $R_3$ and $R_4$ in Formula (1) may be 5 or less, may be 3 or less, or may be 1. As the number of carbon atoms in $R_1$ to $R_4$ is smaller, the non-aqueous electrolytic solution can dissolve sodium metal more efficiently, thus enhancing the safety of the sodium secondary batteries.

The chain carboxylic acid esters represented by Formula (1) include at least one fluoro group, and thus can exhibit excellent oxidation resistance as described hereinabove.

Typically, the oxygen atom of the carbonyl group coordinates to a sodium ion, thereby stabilizing the sodium ion. This coordination accelerates the dissociation of a sodium salt and thus increases electrical conductivity of the electrolytic solution. In the case where an electron-withdrawing fluoro group is bonded to the α-carbon atom contained in the carbonyl group, the fluoro group will attract the electrons in the carbonyl oxygen atom via the carbonyl carbon atom. As a result, the interaction between the carbonyl group and the sodium ion is weakened, thus making the sodium salt hardly dissociated. On the other hand, the chain carboxylic acid ester represented by Formula (1) can suppress the reduction in dissolving capability of the sodium salt, because the fluoro group thereof is remote from the carbonyl carbon atom. That is, the chain carboxylic acid esters represented by Formula (1) exhibit excellent oxidation resistance without causing a decrease in electrical conductivity.

Examples of the chain carboxylic acid esters represented by Formula (1) include fluoromethyl acetate, difluoromethyl acetate, trifluoromethyl acetate, methyl 3-fluoropropionate, methyl 3,3-difluoropropionate, methyl 3,3,3-trifluoropropionate, methyl 3-fluoro-2-methylpropionate, methyl 3,3-difluoro-2-methylpropionate, methyl 3,3,3-trifluoro-2-methylpropionate, methyl 3,3,3-trifluoro-2,2-dimethylpropionate, fluoromethyl propionate, difluoromethyl propionate, trifluoromethyl propionate, fluoromethyl 3-fluoropropionate, trifluoromethyl 3,3,3-trifluoropropionate, 2-fluoroethyl acetate, 2,2-difluoroethyl acetate, 2,2,2-trifluoroethyl acetate, 1-fluoroethyl acetate, 1,1-difluoroethyl acetate, 1,1,2,2,2-pentafluoroethyl acetate, 2-fluoroethyl propionate, 2,2-difluoroethyl propionate, 2,2,2-trifluoroethyl propionate, 1-fluoroethyl propionate, 1,1-difluoroethyl propionate, 1,1,2,2,2-pentafluoroethyl propionate, ethyl 3-fluoropropionate, ethyl 3,3-difluoropropionate, ethyl 3,3,3-trifluoropropionate, 2,2,2-trifluoroethyl 3,3,3-trifluoropropionate, 1,1,2,2,2-pentafluoroethyl 3,3,3-trifluoropropionate, 2-fluoroethyl 3-fluoropropionate, and derivatives thereof. These fluoro group-containing chain carboxylic acid esters may be used singly, or two or more may be used in combination. From the viewpoint of ion conductivity, the fluoro group-containing chain carboxylic acid esters may be carboxylic acid esters of 3 or 4 carbon atoms. From the viewpoint of oxidation resistance, the fluoro group-containing chain carboxylic acid esters may have a plurality of (for example, 3 or more) fluoro groups. From the comprehensive viewpoint of properties such as viscosity and oxidation resistance, at least one selected from the group consisting of methyl 3,3,3-trifluoropropionate and 2,2,2-trifluoroethyl acetate may be used as the fluoro group-containing chain carboxylic acid ester.

Examples of the sodium salts to be dissolved in the non-aqueous solvent include $NaBF_4$, $NaPF_6$, $NaAsF_6$, $NaClO_4$, $NaCF_3SO_3$, $NaN(SO_2CF_3)_2$, $NaN(SO_2C_2F_5)_2$, $NaN(SO_2F)_2$, $NaN(SO_2CF_3)(SO_2F)$, and sodium bis(oxalato)borate. These sodium salts may be used singly, or two or more may be used in combination. From the viewpoints of ion conductivity and availability, the sodium salt may be at least one selected from the group consisting of $NaBF_4$, $NaPF_6$, $NaN(SO_2CF_3)_2$ and $NaN(SO_2F)_2$. From the comprehensive viewpoint of properties such as oxidation resistance and ion conductivity, $NaPF_6$ may be used as the sodium salt.

In the present embodiment, the molar concentration of the sodium salt in the non-aqueous electrolytic solution is not particularly limited. For example, the molar concentration of the sodium salt in the non-aqueous electrolytic solution may be 0.5 mol/L to 2.0 mol/L. From the viewpoint of ion conductivity, the molar concentration of the sodium salt may be 0.7 mol/L to 1.5 mol/L.

The non-aqueous solvent in the non-aqueous electrolytic solution may be substantially the fluoro group-containing carboxylic acid ester alone. In this case, from the viewpoint of ion conductivity, the solvent in the non-aqueous electrolytic solution may be a mixed solvent including a fluoro group-containing cyclic carboxylic acid ester and the fluoro group-containing chain carboxylic acid ester. This mixed solvent and the sodium salt may give a non-aqueous electrolytic solution for sodium secondary batteries which exhibits high ion conductivity and excellent oxidation resistance. The phrase "the non-aqueous solvent is substantially the fluoro group-containing carboxylic acid ester alone" means that any substances other than the fluoro group-containing carboxylic acid ester are not positively added as solvent components.

The fluoro group-containing cyclic carboxylic acid esters are represented by General Formula (3) below:

(3)

In Formula (3), $R_3$ is an unsaturated aliphatic group or a saturated aliphatic group and includes at least one fluoro group. The aromatic group, the unsaturated aliphatic group or the saturated aliphatic group may include a halogen atom, a nitrogen atom, an oxygen atom, a sulfur atom or a silicon atom. The number of carbon atoms in $R_3$ in Formula (3) may be 2 to 7, may be 3 to 5, or may be 3 or 4.

Examples of the fluoro group-containing cyclic carboxylic acid esters include α-fluoro-γ-butyrolactone, β-fluoro-γ-butyrolactone, γ-fluoro-γ-butyrolactone, α,β-difluoro-γ-butyrolactone, α-fluoro-γ-valerolactone, β-fluoro-γ-valerolactone, γ-fluoro-γ-valerolactone, and derivatives thereof. These fluoro group-containing cyclic carboxylic acid esters may be used singly, or two or more may be used in combination. From the viewpoint of oxidation resistance, the fluoro group-containing cyclic carboxylic acid esters may have a plurality of (for example, 3 or more) fluoro groups.

The mixture ratio of the fluoro group-containing cyclic carboxylic acid ester and the fluoro group-containing chain carboxylic acid ester is not particularly limited. For example, the mixture ratio may satisfy the relation of $0.2 \leq (V1/V2) \leq 2$ wherein V1 is the volume of the fluoro group-containing cyclic carboxylic acid ester and V2 is the volume of the fluoro group-containing chain carboxylic acid ester.

The non-aqueous electrolytic solution in the present embodiment may include another non-aqueous solvent in addition to the fluoro group-containing chain carboxylic acid ester. Known solvents used in non-aqueous electrolytic solutions may be used as such additional non-aqueous solvents. Examples of the additional non-aqueous solvents include cyclic or chain ester carbonates, fluoro-free cyclic or chain carboxylic acid esters, cyclic or chain ethers, nitriles and amides. The non-aqueous electrolytic solution containing an ester carbonate, in particular, a cyclic ester carbonate, has a high degree of the dissociation of the sodium salt.

Accordingly, this non-aqueous electrolytic solution can dissolve a sufficient amount of the sodium salt, thus decreasing the internal resistance of the battery. In view of this, the non-aqueous electrolytic solution may include a cyclic ester carbonate as an additional non-aqueous solvent.

Examples of the cyclic ester carbonates include ethylene carbonate, propylene carbonate, butylene carbonate, vinylene carbonate, fluoroethylene carbonate, 4,5-difluoroethylene carbonate, 4,4,4-trifluoroethylene carbonate, fluoromethylethylene carbonate, trifluoromethylethylene carbonate, 4-fluoropropylene carbonate, 5-fluoropropylene carbonate, and derivatives thereof. These cyclic ester carbonates may be used singly, or two or more may be used in combination. From the viewpoint of the comprehensive balance of properties, the cyclic ester carbonate may be at least one selected from the group consisting of ethylene carbonate, propylene carbonate, vinylene carbonate, fluoroethylene carbonate and 4,5-difluoroethylene carbonate. Further, the cyclic ester carbonate may be at least one selected from the group consisting of ethylene carbonate, propylene carbonate and fluoroethylene carbonate. From the viewpoint of oxidation resistance, the cyclic ester carbonate may be fluoroethylene carbonate.

Examples of the chain ester carbonates include dimethyl carbonate, ethylmethyl carbonate, diethyl carbonate, methylpropyl carbonate, ethylpropyl carbonate, methylisopropyl carbonate, and derivatives thereof. From the viewpoint of oxidation resistance, the derivatives of chain ester carbonates may be fluorinated derivatives in which at least one of the hydrogen atoms in the above carbonates is substituted by a fluoro group. These chain ester carbonates may be used singly, or two or more may be used in combination.

Examples of the fluoro-free esters include cyclic esters such as γ-butyrolactone and γ-valerolactone, chain esters such as methyl acetate, ethyl acetate, propyl acetate, butyl acetate, methyl propionate, ethyl propionate, propyl propionate and butyl propionate, and derivatives thereof. Examples of the derivatives include compounds resulting from the substitution of at least one of the hydrogen atoms in the above esters by a fluoro group. Such substitution can enhance oxidation resistance of the non-aqueous electrolytic solution.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol and crown ethers, chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether, and derivatives thereof. Examples of the derivatives include compounds resulting from the substitution of at least one of the hydrogen atoms in the above ethers by a fluoro group. Such substitution can enhance oxidation resistance of the non-aqueous electrolytic solution.

Examples of the nitriles include acetonitrile, valeronitrile, trimethylacetonitrile, cyclopentanecarbonitrile, adiponitrile and pimelonitrile. Examples of the amides include dimethylformamide.

The mixture ratio of the fluoro group-containing carboxylic acid ester and the additional non-aqueous solvent is not particularly limited. For example, the mixture ratio may satisfy the relation of $0.5 \leq (V3/V4) \leq 4$ wherein V3 is the volume of the fluoro group-containing carboxylic acid ester and V4 is the volume of the additional non-aqueous solvent.

The non-aqueous electrolytic solution including the fluoro group-containing carboxylic acid ester has excellent oxidation resistance. The sodium secondary battery 100 including such a non-aqueous electrolytic solution can be resistant to oxidative decomposition. That is, the sodium secondary battery 100 according to the present embodiment can achieve high stability.

Typically, a non-aqueous solvent in a sodium secondary battery is more likely to be oxidatively decomposed when the potential of a positive electrode based on Na reaches 3.9 V or more during the charging of the sodium secondary battery. In contrast, the non-aqueous electrolytic solution according to the present embodiment can be resistant to oxidative decomposition even when the potential of the positive electrode 10 based on Na reaches 3.9 V or more, for example, 4.2 V. Therefore, the sodium secondary battery 100 according to the present embodiment can be charged until the potential of the positive electrode 10 reaches a high potential without the non-aqueous electrolytic solution being oxidatively decomposed. Thus, the sodium secondary battery 100 according to the present embodiment can achieve an increase in capacity. As will be demonstrated by experiment results later, the sodium secondary battery 100 can achieve an increased capacity even when the potential of the positive electrode 10 based on Na does not reach a high level of 3.9 V or more during charging.

The non-aqueous electrolytic solution which includes the fluoro group-containing chain carboxylic acid ester can suppress the deposition of sodium metal on the negative electrode 20. Thus, the sodium secondary battery 100 including such a non-aqueous electrolytic solution can prevent the sodium metal from depositing on the negative electrode 20 and thereby forming an internal short circuit. That is, the sodium secondary battery 100 according to the present embodiment can exhibit high safety and can be operated stably.

(Reference Embodiment)

Hereinbelow, specific examples of sodium secondary batteries according to a reference embodiment will be described with reference to the drawings. In the reference embodiment, features identical to those in the aforementioned embodiment may be sometimes omitted.

[Configurations of Sodium Secondary Batteries]

The sodium secondary batteries according to the reference embodiment may have the same configuration as the sodium secondary batteries according to the aforementioned embodiment, except that the non-aqueous electrolytic solution contains different substances. That is, the sodium secondary batteries according to the reference embodiment may have a configuration illustrated in FIGS. 1 and 2 as an example. The description of the configuration is omitted.

[Non-aqueous Electrolytic Solutions for Sodium Secondary Batteries]

The non-aqueous electrolytic solution for sodium secondary batteries in the reference embodiment includes a non-aqueous solvent and a sodium salt dissolved in the non-aqueous solvent. The non-aqueous solvent includes a fluoro group-containing ester carbonate. For example, the content of the ester carbonate in the non-aqueous solvent is 30 wt % or more.

The upper limit of the content of the fluoro group-containing ester carbonate in the non-aqueous solvent is not particularly limited. However, from the comprehensive viewpoints such as properties and cost of the non-aqueous solvent, the content of the fluoro group-containing ester carbonate in the non-aqueous solvent may be 80 wt % or less, or may be 50 wt % or less.

The fluoro group-containing ester carbonate includes a chain ester carbonate represented by Formula (4) below:

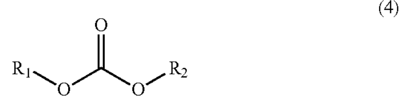

(4)

In Formula (4), $R_1$ and $R_2$ are each a monovalent aromatic group, a monovalent unsaturated aliphatic group or a monovalent saturated aliphatic group. $R_1$ and $R_2$ may be the same or different from each other. At least one of $R_1$ and $R_2$ includes at least one fluoro group. The number of carbon atoms in each of $R_1$ and $R_2$ in Formula (4) may be 6 or less, may be 1 to 4, or may be 1 or 2. That is, the number of carbon atoms in the chain ester carbonate of Formula (4) may be 3 to 5. As the number of carbon atoms in $R_1$ and $R_2$ is smaller, the non-aqueous electrolytic solution can dissolve sodium metal more efficiently, thus enhancing the safety of the sodium secondary batteries.

The fluoro group-containing ester carbonates have excellent oxidation resistance even in the absence of coordination to sodium ions. Thus, the non-aqueous electrolytic solution for sodium secondary batteries which includes the fluoro group-containing ester carbonate can exhibit excellent oxidation resistance. As a result, the sodium secondary battery containing the non-aqueous electrolytic solution can be operated stably.

Although not necessarily clear, the following is assumed to be the mechanism by which the fluoro group-containing ester carbonate exhibits excellent oxidation resistance. When an electron-withdrawing fluoro group is introduced into the ester carbonate skeleton, the HOMO (highest occupied molecular orbital) energy of the ester carbonate is decreased. This is probably why the oxidation resistance of the ester carbonate is increased. The non-aqueous electrolytic solution containing the fluoro group-containing ester carbonate shows higher oxidation resistance in accordance with the content of the carbonate. To enhance oxidation resistance, for example, the content of the ester carbonate in the non-aqueous solvent may be 30 wt % or more.

The non-aqueous electrolytic solution including a fluoro group-containing chain ester carbonate can enhance the safety of sodium secondary batteries. The reasons for this will be described below.

In sodium secondary batteries, sodium metal is sometimes deposited on the surface of a negative electrode during overcharging. The sodium metal that has been deposited may penetrate a separator and reach a positive electrode, possibly causing an internal short circuit. The internal short circuit may cause a large current to be passed therethrough, and thereby a large amount of Joule heat may be generated. Thus, the safety of sodium secondary batteries may be lowered.

The non-aqueous electrolytic solution including a fluoro group-containing chain ester carbonate may suppress the deposition of sodium metal on negative electrodes. Specifically, sodium metal is dissolved by the reaction with the fluoro group-containing chain ester carbonate. This can prevent the occurrence of an internal short circuit in the sodium secondary battery.

The fluoro group-containing chain ester carbonates dissolve sodium metal deposited on the negative electrodes probably because of the following actions.

First, it is probable that the fluoro group-containing chain ester carbonates are easily reductively decomposed because of having a fluoro group. As compared to chain ester carbonates having no fluoro groups, the fluoro group-containing chain ester carbonates have a lower LUMO level. In addition, anions, produced by the decomposition of the fluoro group-containing chain ester carbonates, are stabilized by their own electron-withdrawing fluoro groups. As a result, the fluoro group-containing chain ester carbonates are more likely to be reduced and decomposed, thus causing sodium metal easily to be dissolved.

Secondly, it is probable that the fluoro group-containing chain ester carbonates are, because of their own chain structures, less likely to form passive state films which inhibit the dissolution of sodium metal. Both the fluoro group-containing chain ester carbonates and fluoro group-containing cyclic ester carbonates will form passive state films on negative electrodes. However, the fluoro group-containing chain ester carbonates have a lower tendency of forming passive state films than the fluoro group-containing cyclic ester carbonates. Consequently, the fluoro group-containing chain ester carbonates may dissolve sodium metal, if any deposited on the negative electrodes, without covering the sodium metal with the passive state films. The difference in the tendency of forming passive state films is probably ascribed to the following difference. The fluoro group-containing cyclic ester carbonates are ring-opened by reductive decomposition. On the other hand, the fluoro group-containing chain ester carbonates are split by the reductive decomposition into a low-molecular weight anion and a low-molecular weight radical. That is, the decomposition products of the fluoro group-containing chain ester carbonate have lower molecular weights than the decomposition product of the fluoro group-containing cyclic ester carbonate. This is probably the reason why the fluoro group-containing chain ester carbonates hardly form passive state films having a high molecular weight.

Probably for the reasons described above, the fluoro group-containing chain ester carbonates can dissolve sodium metal more easily than fluoro group-containing cyclic ester carbonates or fluoro-free chain ester carbonates.

In order to enhance the safety of the sodium secondary batteries, the non-aqueous electrolytic solution may include a low-molecular weight chain ester carbonate, in other words, a chain ester carbonate with a small number of carbon atoms.

The effect in enhancing the safety of sodium secondary batteries can be obtained even when the content of the chain ester carbonate in the non-aqueous solvent is less than 30 wt %.

The ester carbonates can exhibit a higher capability of dissolving sodium metal with increasing number of fluoro groups. This is because, as the number of fluoro groups contained in the ester carbonates increases, the LUMO level thereof is lowered and the carbonate is reductively decomposed more easily.

In the reference embodiment, the negative electrode active material may be a material capable of allowing sodium ions to be inserted therein and released therefrom. In this case, the fluoro group-containing chain ester carbonates can dissolve sodium metal without causing a degradation of the negative electrode active material.

Examples of the fluoro group-containing chain ester carbonates include fluoromethylmethyl carbonate, (difluoromethyl)methyl carbonate, (trifluoromethyl)methyl carbonate, (trifluoromethyl)methyl carbonate, 1,2-difluoromethyl carbonate, (1-fluoroethyl)methyl carbonate, (2-fluoroethyl) methyl carbonate, (1,1-difluoroethyl)methyl carbonate, (2,2-difluoroethyl)methyl carbonate, (2,2,2-trifluoroethyl)methyl carbonate, ethyl(fluoromethyl) carbonate, ethyl(difluoromethyl) carbonate, ethyl(trifluoromethyl) carbonate, (1,1,2,2,2-pentafluoroethyl)methyl carbonate, (1-fluoroethyl)ethyl carbonate, (2-fluoroethyl)ethyl carbonate, (1,1-difluoroethyl)ethyl carbonate, (2,2-difluoroethyl)ethyl carbonate, (2,2,2-trifluoroethyl)ethyl carbonate, (1,1,2,2,2-pentafluoroethyl)ethyl carbonate, and derivatives thereof. These fluoro group-containing chain ester carbonates may be used singly, or two or more may be used in combination. From the viewpoints of viscosity and safety, the fluoro group-containing chain ester carbonates may be ester carbonates of 3 to 5 carbon atoms. From the viewpoint of oxidation resistance, the fluoro group-containing chain ester carbonates may have a plurality of (for example, 3 or more) fluoro groups. From the comprehensive viewpoint of properties such as viscosity and oxidation resistance, (2,2,2-trifluoroethyl)methyl carbonate may be used as the fluoro group-containing chain ester carbonate.

The sodium salts to be dissolved in the non-aqueous solvent may be appropriately any of the materials described in the aforementioned embodiment.

The non-aqueous solvent in the non-aqueous electrolytic solution may be substantially the fluoro group-containing ester carbonate alone. In this case, excellent oxidation resistance can be imparted to the non-aqueous electrolytic solution. The phrase "the non-aqueous solvent is substantially the fluoro group-containing ester carbonate alone" means that any substances other than the fluoro group-containing ester carbonate are not positively added as solvent components.

From the viewpoint of ion conductivity, the non-aqueous solvent in the non-aqueous electrolytic solution may be a mixed solvent including a fluoro group-containing cyclic ester carbonate and the fluoro group-containing chain ester carbonate. This mixed solvent and the sodium salt may give a non-aqueous electrolytic solution for sodium secondary batteries which exhibits high ion conductivity and excellent oxidation resistance. The non-aqueous solvent may be substantially the mixed solvent alone, or may be a mixture of the mixed solvent and a non-aqueous solvent other than the fluoro group-containing ester carbonate.

The fluoro group-containing cyclic ester carbonates are represented by General Formula (5) below:

(5)

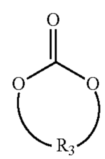

In Formula (5), $R_3$ is a divalent unsaturated aliphatic group or a divalent saturated aliphatic group and includes at least one fluoro group. The aromatic group, the unsaturated aliphatic group or the saturated aliphatic group may include a halogen atom, a nitrogen atom, an oxygen atom, a sulfur atom or a silicon atom. The number of carbon atoms in $R_3$ in Formula (5) may be 2 to 7, may be 3 to 5, or may be 3 or 4.

Examples of the fluoro group-containing cyclic ester carbonates include fluoroethylene carbonate, 4,4-difluoroethylene carbonate, 4,5-difluoroethylene carbonate, 4,4,5-trifluoroethylene carbonate, 4,4,5,5-hexafluoroethylene carbonate, 3-fluoropropylene carbonate, 4-fluoropropylene carbonate, 5-fluoropropylene carbonate, 3,3,3-trifluoropropylene carbonate, and derivatives thereof. These fluoro group-containing cyclic ester carbonates may be used singly, or two or more may be used in combination. From the viewpoint of oxidation resistance, the fluoro group-containing cyclic ester carbonates may have a plurality of (for example, 3 or more) fluoro groups.

The mixture ratio of the fluoro group-containing cyclic ester carbonate and the fluoro group-containing chain ester carbonate is not particularly limited. For example, the mixture ratio may satisfy the relation of $0.2 \leq (V1'/V2') \leq 1.0$ wherein V1' is the volume of the fluoro group-containing cyclic ester carbonate and V2' is the volume of the fluoro group-containing chain ester carbonate.

The non-aqueous electrolytic solution in the reference embodiment may include another non-aqueous solvent in addition to the fluoro group-containing chain ester carbonate. Known solvents used in non-aqueous electrolytic solutions may be used as such additional non-aqueous solvents. Examples of the additional non-aqueous solvents include fluoro-free cyclic or chain ester carbonates, cyclic or chain carboxylic acid esters, cyclic or chain ethers, nitriles and amides.

Examples of the fluoro-free cyclic ester carbonates include ethylene carbonate, propylene carbonate, butylene carbonate, vinylene carbonate, vinylethylene carbonate, and derivatives thereof. These fluoro-free cyclic ester carbonates may be used singly, or two or more may be used in combination.

Examples of the fluoro-free chain ester carbonates include dimethyl carbonate, ethylmethyl carbonate, diethyl carbonate, methylpropyl carbonate, ethylpropyl carbonate, methylisopropyl carbonate, and derivatives thereof. These fluoro-free chain ester carbonates may be used singly, or two or more may be used in combination.

Examples of the above derivatives include compounds resulting from the substitution of at least one of the hydrogen atoms in the above ester carbonates by a fluoro group. Such substitution can enhance oxidation resistance of the non-aqueous electrolytic solution.

Examples of the carboxylic acid esters include cyclic carboxylic acid esters such as γ-butyrolactone and γ-valerolactone, chain carboxylic acid esters such as methyl acetate, ethyl acetate, propyl acetate, butyl acetate, methyl propionate, ethyl propionate, propyl propionate and butyl propionate, and derivatives thereof. Examples of the derivatives include compounds resulting from the substitution of at least one of the hydrogen atoms in the above carboxylic acid esters by a fluoro group. Such substitution can enhance oxidation resistance of the non-aqueous electrolytic solution. These carboxylic acid esters may be used singly, or two or more may be used in combination.

Examples of the ethers, the nitriles and the amides include those materials described in the aforementioned embodiment.

The non-aqueous electrolytic solution including the fluoro group-containing ester carbonate has excellent oxidation resistance. The sodium secondary battery 100 according to the reference embodiment includes such a non-aqueous electrolytic solution which can be resistant to oxidative decomposition. That is, the sodium secondary battery 100 according to the reference embodiment can achieve high reliability.

Typically, a non-aqueous solvent in a sodium secondary battery is more likely to be oxidatively decomposed when the potential of a positive electrode 10 based on Na reaches 3.9 V or more during the charging of the sodium secondary battery. In contrast, the non-aqueous electrolytic solution according to the reference embodiment can be resistant to oxidative decomposition even when the potential of the positive electrode 10 based on Na reaches 3.9 V or more, for example, 4.2 V. Therefore, the sodium secondary battery 100 can be charged until the potential of the positive electrode 10 reaches a high potential without the non-aqueous electrolytic solution being oxidatively decomposed. Thus, the sodium secondary battery according to the reference embodiment can achieve an increase in capacity.

The non-aqueous electrolytic solution which includes the fluoro group-containing chain ester carbonate can suppress the deposition of sodium metal on the negative electrode 20. Thus, the sodium secondary battery 100 including such a non-aqueous electrolytic solution can prevent the sodium metal from depositing on the negative electrode 20 and thereby forming an internal short circuit. That is, the sodium secondary battery 100 according to the reference embodiment can exhibit high safety and can be operated stably.

EXAMPLES

Experiment 1

LSV (linear sweep voltammetry) measurement was carried out on electrolytic solutions of Reference Examples 1-1, 1-2, 1-3, 1-4 and 1-5, and Comparative Examples 1-1 and 1-2, thereby studying the oxidation resistance of the electrolytic solutions.

Reference Example 1-1

The electrolytic solution of Reference Example 1-1 was obtained by dissolving $NaPF_6$ (CAS No.: 21324-39-0) in a mixed solvent (volume ratio 25:75) of fluoroethylene carbonate (FEC) (CAS No.: 114435-02-8) and 2,2,2-trifluoroethyl acetate (FEA) (CAS No.: 406-95-1), with a concentration of 1.0 mol/L.

Reference Example 1-2

The electrolytic solution of Reference Example 1-2 was obtained by dissolving $NaPF_6$ in FEA with a concentration of 0.2 mol/L.

Reference Example 1-3

The electrolytic solution of Reference Example 1-3 was obtained by dissolving $NaPF_6$ in a mixed solvent (volume ratio 25:75) of FEC and methyl 3,3,3-trifluoropropionate (FMP) (CAS No.: 18830-44-9), with a concentration of 0.9 mol/L.

Reference Example 1-4

The electrolytic solution of Reference Example 1-4 was obtained by dissolving $NaPF_6$ in a mixed solvent (volume ratio 25:25:50) of FEC, diethyl carbonate (DEC) (CAS No.: 105-58-8) and FMP, with a concentration of 1.0 mol/L.

Reference Example 1-5

The electrolytic solution of Reference Example 1-5 was obtained by dissolving $NaPF_6$ in a mixed solvent (volume ratio 25:50:25) of FEC, DEC and FMP, with a concentration of 1.0 mol/L.

Comparative Example 1-1

The electrolytic solution of Comparative Example 1-1 was obtained by dissolving $NaPF_6$ in a mixed solvent (volume ratio 25:75) of FEC and DEC, with a concentration of 1.0 mol/L.

Comparative Example 1-2

The electrolytic solution of Comparative Example 1-2 was obtained by dissolving $NaPF_6$ in a mixed solvent (volume ratio 25:75) of ethylene carbonate (EC) (CAS No.: 96-49-1) and DEC, with a concentration of 1.0 mol/L.

As described above, the electrolytic solutions of Reference Examples 1-1, 1-2, 1-3, 1-4 and 1-5 contained a fluoro group-containing chain carboxylic acid ester, while the electrolytic solutions of Comparative Examples 1-1 and 1-2 contained no fluoro group-containing carboxylic acid esters.

[Evaluation of Oxidation Resistance by LSV Measurement]

Figure 3:
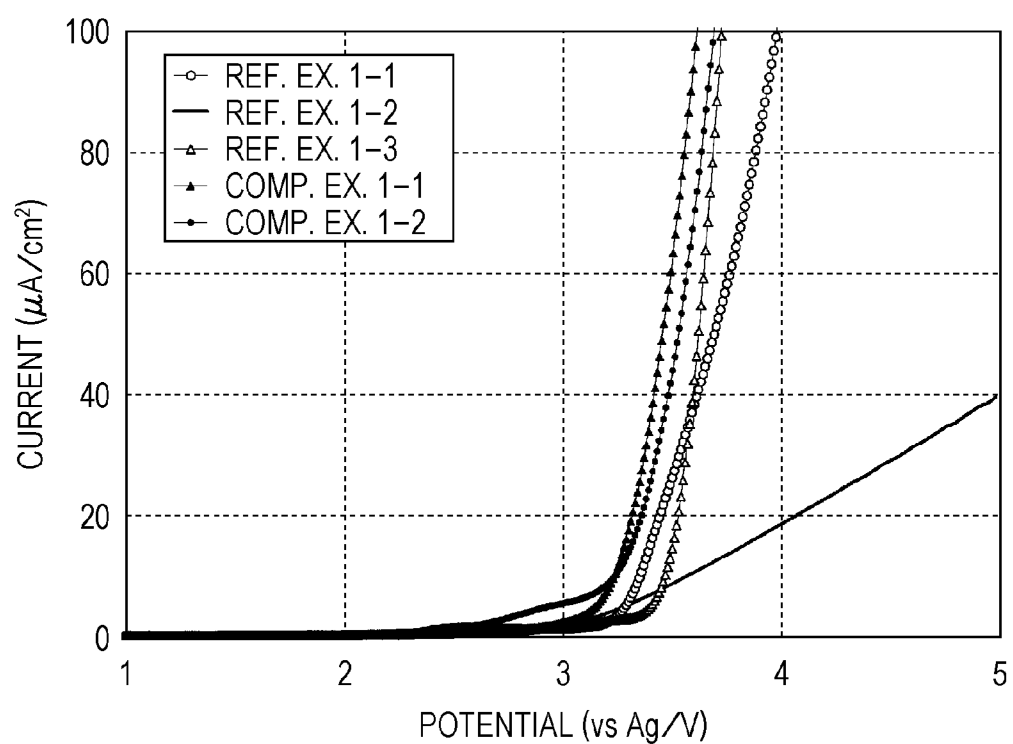
FIG. 3 is a diagram illustrating potential-current curves obtained by LSV measurement with respect to electrolytic solutions in Reference Examples 1-1 to 1-3, and Comparative Examples 1-1 and 1-2.
Figure 4:
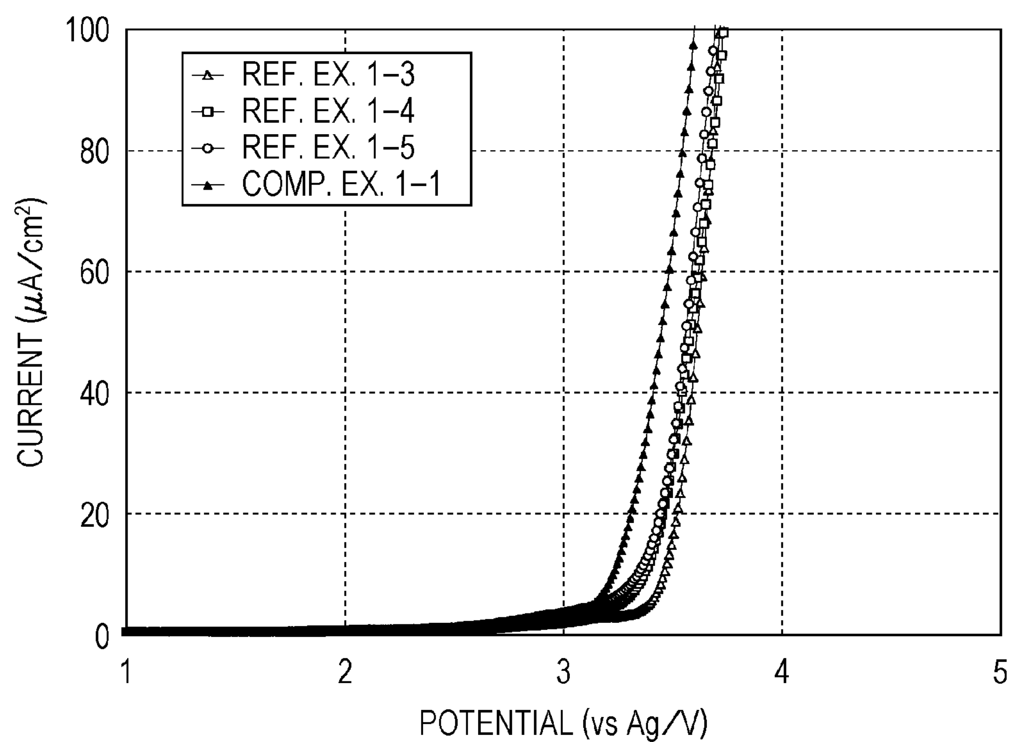
FIG. 4 is a diagram illustrating potential-current curves obtained by LSV measurement with respect to electrolytic solutions in Reference Examples 1-3 to 1-5 and Comparative Example 1-1.

LSV measurement was carried out on the non-aqueous electrolytic solutions for sodium secondary batteries prepared above (Reference Examples 1-1 to 1-5, and Comparative Examples 1-1 and 1-2). The measurement apparatus used was a potentiogalvanostat, and the measurement cell was an H-type cell. The working electrode was a circular platinum electrode having a diameter of 16 mm, and the counter electrode was a platinum grid. A silver wire was used as the reference electrode. The potential was scanned at 10 mV/sec. The oxidation current density at the working electrode was plotted on a graph versus the potential of the working electrode. The results are shown in FIGS. 3 and 4. In FIGS. 3 and 4, a vertical axis indicates the current density of the oxidation current which was passed through the working electrode, and a horizontal axis indicates the potential of the working electrode with reference to the silver reference electrode. Table 1 describes the potentials of the working electrode obtained when the oxidation current density at the working electrode reached 20 $\mu A/cm^2$. In Experiment 1, the point where the oxidation current density reached 20 $\mu A/cm^2$ may be also written as “the oxidation current started to flow”.

TABLE 1

| | Compositions of solvents | Potentials [V] of working electrode at 20 $\mu A/cm^2$ |
|---|---|---|
| Ref. Ex. 1-1 | FEC + FEA (25:75) | 3.45 |
| Ref. Ex. 1-2 | FEA | 4.07 |
| Ref. Ex. 1-3 | FEC + FMP (25:75) | 3.53 |
| Ref. Ex. 1-4 | FEC + DEC + FMP (25:25:50) | 3.46 |
| Ref. Ex. 1-5 | FEC + DEC + FMP (25:50:25) | 3.45 |
| Comp. Ex. 1-1 | FEC + DEC (25:75) | 3.32 |
| Comp. Ex. 1-2 | EC + DEC (25:75) | 3.36 |

From the comparison of the results of Reference Examples 1-1, 1-2 and 1-3 with the results of Comparative Examples 1-1 and 1-2, as illustrated in FIG. 3, the oxidation current started to flow at a higher potential in the non-aqueous electrolytic solutions of Reference Examples than in the non-aqueous electrolytic solutions of Comparative Examples. Similarly, as illustrated in FIG. 4, the comparison of the results of Reference Examples 1-3, 1-4 and 1-5 with the results of Comparative Example 1-1 shows that the oxidation current started to flow at a higher potential in the non-aqueous electrolytic solutions of Reference Examples than in the non-aqueous electrolytic solution of Comparative Example. These results mean that the non-aqueous electrolytic solutions of Reference Examples have higher oxidation resistance than the non-aqueous electrolytic solutions of Comparative Examples. As shown by the results of Reference Example 1-5 in Table 1, the effect in enhancing the oxidation resistance was obtained even when the content of the fluoro group-containing carboxylic acid ester was small. As shown by the results of Reference Examples 1-3, 1-4 and 1-5 in Table 1, the effect on the enhancement in oxidation resistance was increased with increasing content of the fluoro group-containing carboxylic acid ester in the non-aqueous electrolytic solution.

Experiment 2

Next, properties of sodium secondary batteries of Examples 2-1, 2-2 and 2-3, and Comparative Example 2-1 were studied by a charge/discharge test at a constant current value, and also by an overcharge test.

Examples 2-1 to 2-3 and Comparative Example 2-1

First, sodium secondary batteries of Examples 2-1, 2-2 and 2-3, and Comparative Example 2-1 were fabricated in the following manner.

(i) Electrolytic Solutions

The electrolytic solution of Reference Example 1-1 was used for the battery of Example 2-1. The electrolytic solution of Reference Example 1-3 was used for the battery of Example 2-2. The electrolytic solution used for the battery of Example 2-3 had the same composition as that in Reference Example 1-1, except that FEC was replaced by EC. The electrolytic solution of Comparative Example 1-1 was used for the battery of Comparative Example 2-1.

(ii) Positive Electrodes

Sodium carbonate ($Na_2CO_3$) (CAS No.: 497-19-8), iron oxide ($Fe_3O_4$) (CAS No.: 1317-61-9) and cobalt oxide ($Co_3O_4$) (CAS No.: 1308-06-1), all of which had been thoroughly dried, were mixed together such that the molar ratio of sodium, iron and cobalt was 1:0.5:0.5. The mixture was heated and sintered in an air atmosphere. The temperature of the atmosphere was increased from room temperature to 800° C. at a rate of 10° C./min, and was thereafter held at 800° C. for 10 hours. The sintered material was naturally cooled, crushed and classified. As a result, a positive electrode active material represented by $NaFe_{0.5}Co_{0.5}O_2$ was obtained.

80 Parts by weight of $NaFe_{0.5}Co_{0.5}O_2$ as the positive electrode active material, 10 parts by weight of acetylene black as a conductive auxiliary agent and 10 parts by weight of a polyvinylidene fluoride resin as a binder were mixed together. The mixture was dispersed in dehydrated N-methyl-2-pyrrolidone to give a positive electrode material mixture in the form of a slurry. The positive electrode material mixture was applied onto a surface of a positive electrode current collector composed of a 15 μm thick aluminum foil. The positive electrode current collector coated with the positive electrode material mixture was dried and rolled. A positive electrode plate was thus obtained.

(iii) Negative Electrodes

A carbon material as a negative electrode active material was prepared through the following three processes: carbonizing process, classifying process and heat-treating process.

First, the carbonizing process will be described. α-Cellulose as a carbon source (manufactured by Whatman, quantitative filter paper No. 40) was heated in a tube furnace in an argon atmosphere. The flow rate of the argon gas was 1 L/min. The temperature of the argon atmosphere was increased from room temperature to 1000° C. at a rate of 10° C./min, and was thereafter held at 1000° C. for 1 hour. After being naturally cooled, the carbonized material was removed from the tube furnace.

Next, the classifying process will be described. The carbonized material obtained in the carbonizing process was crushed in an agate mortar and was classified through a stainless steel standard sieve having mesh openings of 40 μm. Thus, a powdery carbon material was obtained.

Lastly, the heat-treating process will be described. The carbon material obtained in the classifying process was heated in a tube furnace in an argon atmosphere. The flow rate of the argon gas was 1 L/min. The temperature of the argon atmosphere was increased from room temperature to 1200° C. at a rate of 10° C./min, and was thereafter held at 1200° C. for 1 hour. After being naturally cooled, the carbon material, a hard-graphitizable carbon powder, was removed from the tube furnace. This carbon material is used was a negative electrode active material.

90 Parts by weight of the hard-graphitizable carbon powder as the negative electrode active material and 10 parts by weight of a polyvinylidene fluoride resin as a binder were mixed together. The mixture was dispersed in dehydrated N-methyl-2-pyrrolidone to give a negative electrode material mixture in the form of a slurry. The negative electrode material mixture was applied onto a surface of a negative electrode current collector composed of a 10 μm thick copper foil. The negative electrode current collector coated with the negative electrode material mixture was dried and rolled. A negative electrode plate was thus obtained.

(iv) Fabrication of Sheet-type Batteries

Figure 5:
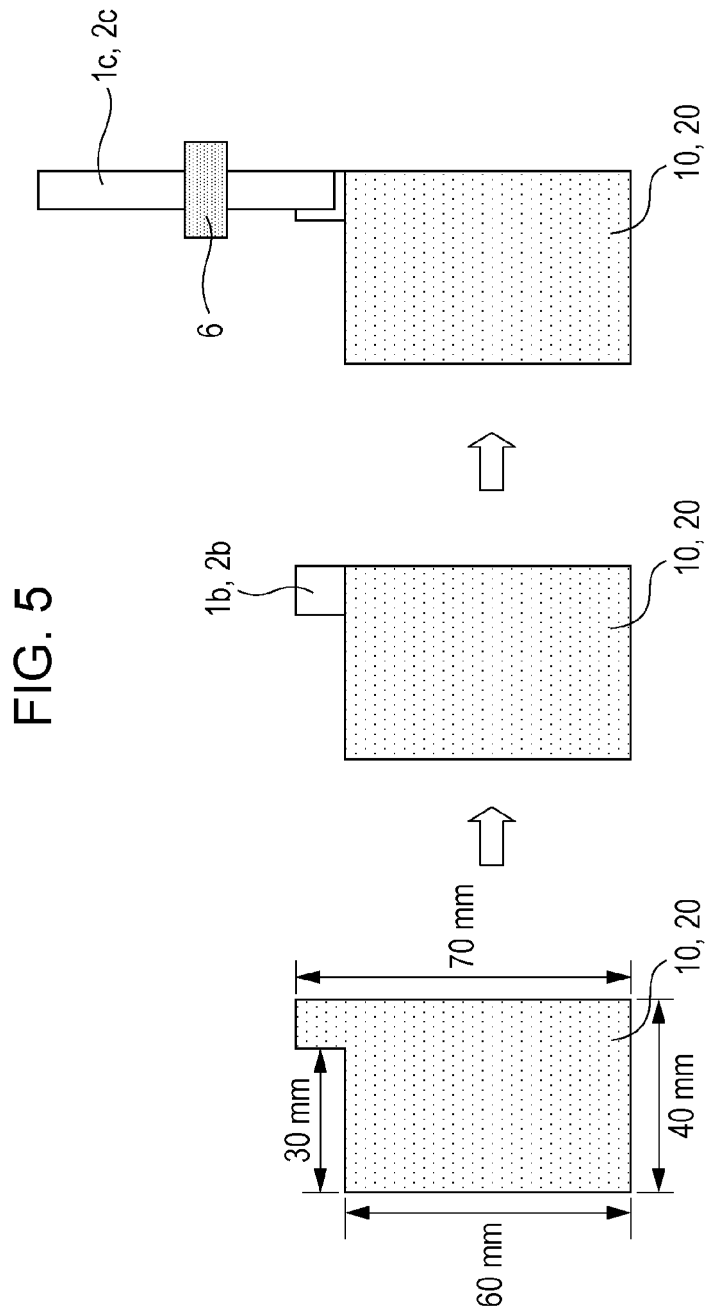
FIG. 5 is a view illustrating an exemplary manufacturing process for manufacturing an electrode assembly in the sodium secondary battery shown in FIG. 1.

A sheet-type battery illustrated in FIGS. 1 and 2 was fabricated using the positive electrode plate and the negative electrode plate. First, as illustrated in FIG. 5, the positive electrode plate was processed into a prescribed shape. A portion of the material mixture layer of the positive electrode plate was separated to expose a portion of the positive electrode current collector. A positive electrode tab lead was welded to the exposed portion of the positive electrode current collector. An insulating tab film made of a polypropylene resin, a heat weldable resin, was heat welded to a longitudinal central portion of the positive electrode tab lead. The negative electrode plate was processed into a prescribed shape in the same manner. The areas of the positive electrode plate and the negative electrode plate were each 24 $cm^2$. The positive electrode tab lead was made of aluminum, and the negative electrode tab lead was made of nickel.

Figure 6:
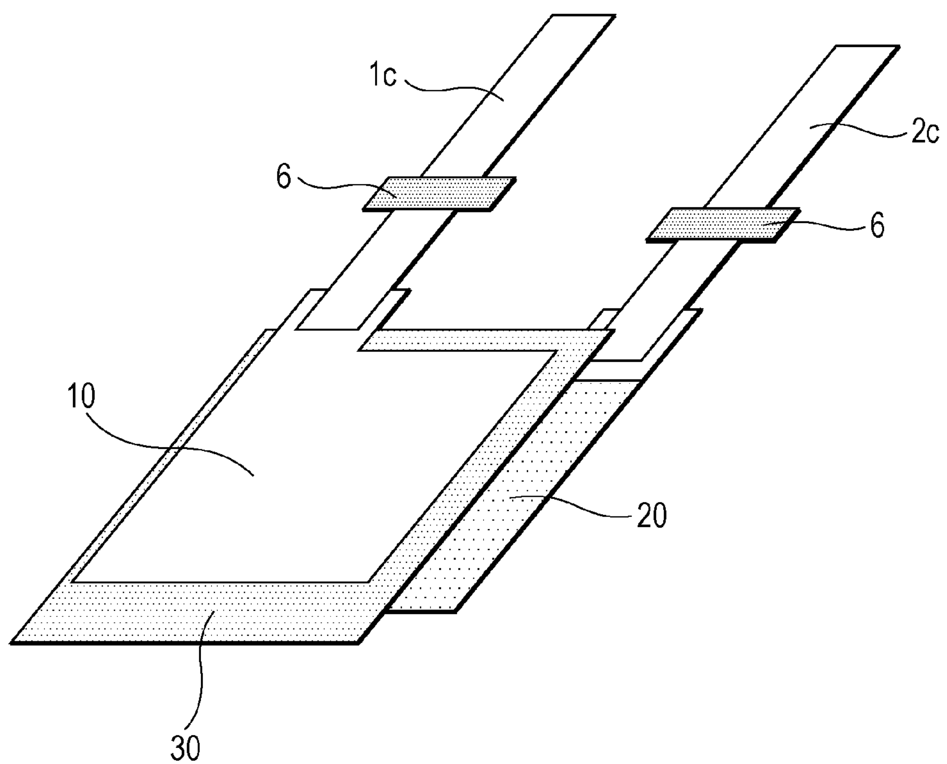
FIG. 6 is a perspective view illustrating an electrode assembly in the sodium secondary battery shown in FIG. 1.

Next, as illustrated in FIG. 6, the positive electrode plate and the negative electrode plate were opposed to each other through a separator, thereby forming an electrode assembly. The separator was polypropylene having a thickness of 30 μm. A laminated film was folded into two, and the end surfaces on the longer sides were heat sealed together at 230° C., thereby forming a cylindrical package. The laminated film was a stack of an aluminum sheet with a synthetic resin. The laminated film had a size of 120 mm×120 mm, and a thickness of 100 μm. The size of the cylindrical package was 120 mm×60 mm. The electrode assembly was placed into the package such that the insulating tab films were positioned at an end surface of the package. Thereafter, one of the end surfaces on the shorter sides of the package was heat sealed at 230° C. Next, 0.8 cc of the non-aqueous electrolytic solution was injected into the package, and then the package was allowed to stand under a vacuum of 0.06 MPa for 15 minutes. As a result, the positive electrode material mixture layer, the negative electrode material mixture layer and the separator were impregnated with the non-aqueous electrolytic solution. Lastly, the other end surface on the shorter side of the package was heat sealed at 230° C. Thus, a sheet-type sodium secondary battery was obtained.

[Charge/discharge Test at Constant Current]

Figure 7:
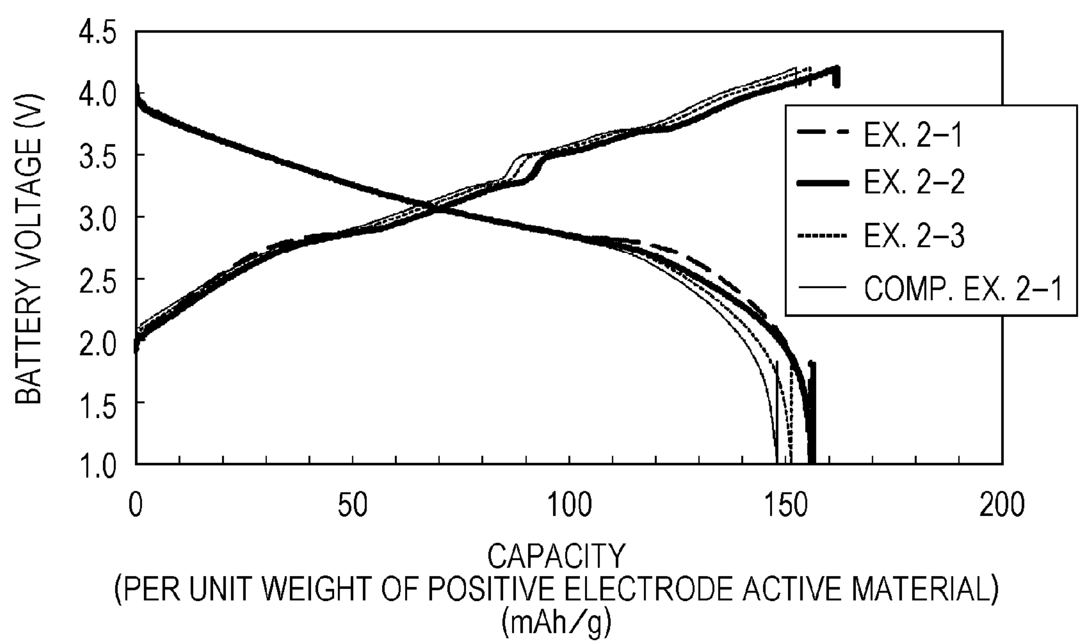
FIG. 7 is a diagram illustrating charge/discharge curves obtained in a third cycle in a charge/discharge test with respect to sodium secondary batteries in Examples 2-1 to 2-3 and Comparative Example 2-1.

Properties of the sodium secondary batteries of Examples 2-1, 2-2 and 2-3, and Comparative Example 2-1 were studied by a charge/discharge test at a constant current value. During the charge/discharge test, a pressure of 0.2 MPa was applied to the battery by sandwiching the battery between a pair of stainless steel plates and further by sandwiching the pair of stainless steel plates with a U-shaped clamp. The stainless steel plates had a size of 80 mm×80 mm and a thickness of 2 mm. The charge/discharge test was performed in a thermostatic chamber at 25° C. With a current density of 0.1 mA/cm$^2$ (per unit area of the positive electrode), the battery was charged and discharged at a constant current three times. The constant-current charging was performed until the voltage of the battery reached 4.2 V, and the constant-current discharging was made until the voltage of the battery reached 1.0 V. A twenty-minute interval was provided between charging and discharging. During the interval, the battery was allowed to stand in an open circuit condition. FIG. 7 illustrates charge/discharge curves obtained in the third cycle. In FIG. 7, the horizontal axis indicates the capacity per unit weight of the positive electrode active material. The discharge capacities in the third cycle are described in Table 2. The discharge capacities shown in the table are the discharge capacities per unit weight of the positive electrode active material.

TABLE 2

| | Compositions of solvents | Discharge capacities in third cycle (per unit weight of positive electrode active material) [mAh/g] |
|---|---|---|
| Ex. 2-1 | FEC + FEA (25:75) | 156 |
| Ex. 2-2 | FEC + FMP (25:75) | 156 |
| Ex. 2-3 | EC + FEA (25:75) | 152 |
| Comp. Ex. 2-1 | FEC + DEC (25:75) | 148 |

As compared to the battery of Comparative Example 2-1, the batteries of Examples 2-1, 2-2 and 2-3 showed a larger discharge capacity. These results are probably ascribed to the excellent oxidation resistance of the electrolytic solutions used in the batteries of Examples 2-1, 2-2 and 2-3. Specifically, it is probable that the electrolytic solutions of Examples 2-1, 2-2 and 2-3 were stable on the positive electrode even when the electrode potential reached a high potential during charging and consequently the degradation of the surface of the positive electrode was suppressed.

[Overcharge Test]

The sodium secondary batteries of Examples 2-1, 2-2 and 2-3, and Comparative Example 2-1 were, after the three cycles of charging and discharging, charged at a current density of 0.1 mA/cm$^2$ until the voltage of the batteries reached 4.4 V. The overcharged batteries were decomposed in an argon atmosphere, and then the negative electrodes were visually observed. The results are described in Table 3.

TABLE 3

| | Changes |
|---|---|
| Ex. 2-1 | No deposits on negative electrode |
| Ex. 2-2 | No deposits on negative electrode |
| Ex. 2-3 | No deposits on negative electrode |
| Comp. Ex. 2-1 | Sodium metal deposited on negative electrode |

As described in Table 3, overcharging of the battery of Comparative Example 2-1 resulted in the deposition of sodium metal on the negative electrode. In contrast, as described in Table 3, sodium metal was not deposited on the negative electrode during the overcharging of the batteries of Examples 2-1, 2-2 and 2-3. The reasons for these results are not fully understood, but probably the fluoro group-containing chain carboxylic acid esters are effective in dissolving sodium metal and suppressing the deposition thereof. The deposition of sodium metal on negative electrodes may cause internal short circuits and thereby may lower the safety of batteries. Thus, the use of fluoro group-containing chain carboxylic acid esters in electrolytic solutions will enhance the safety of sodium secondary batteries.

In the case where negative electrode active materials contain sodium metal, the fluoro group-containing chain carboxylic acid esters may dissolve the negative electrode active materials to degrade the performance of the negative electrodes. On the other hand, the negative electrode active material in the batteries of Examples 2-1, 2-2 and 2-3 is a carbon material. Thus, the performance of the negative electrodes in the batteries of Examples 2-1, 2-2 and 2-3 is hardly degraded in spite of the fact that the electrolytic solutions contain a fluoro group-containing chain carboxylic acid ester. The safety of sodium secondary batteries will be further enhanced with the electrolytic solution containing a fluoro group-containing carboxylic acid ester and the negative electrode active material free from sodium metal (for example, carbon or a metal oxide).

Sodium metal may be used as a negative electrode active material. In this case, a non-aqueous solvent may contain a fluoro group-containing chain carboxylic acid ester in a sufficiently low content to suppress the deposition of sodium metal. For example, a mixture of a fluoro group-containing chain carboxylic acid ester and a cyclic ester carbonate may be used as the non-aqueous solvent.

Experiment 3

Next, properties of sodium secondary batteries of Example 3-1 and Comparative Example 3-1 were studied by a charge/discharge test at a constant current value.

Example 3-1 and Comparative Example 3-1

First, sodium secondary batteries of Example 3-1 and Comparative Example 3-1 were fabricated in the following manner.

(i) Electrolytic Solutions

The electrolytic solution of Reference Example 1-1 was used for the battery of Example 3-1. The electrolytic solution of Comparative Example 1-1 was used for the battery of Comparative Example 3-1.

(ii) Positive Electrodes

The positive electrodes used in Examples 2-1 to 2-3 were used.

(iii) Negative Electrodes

A negative electrode plate was fabricated using $Na_2Ti_3O_7$ as a negative electrode active material in the following manner. Sodium carbonate and anatase-type titanium oxide ($TiO_2$) (CAS No.: 13463-67-7), both of which had been thoroughly dried, were mixed together such that the molar ratio of sodium and titanium was 2:3. The mixture was heated and sintered in an air atmosphere. The temperature of the atmosphere was increased from room temperature to 800° C. at a rate of 10° C./min, and was held at 800° C. for 20 hours. The sintered material was naturally cooled, crushed and classified. As a result, a negative electrode active material represented by $Na_2Ti_3O_7$ was obtained.

60 Parts by weight of $Na_2Ti_3O_7$ as the negative electrode active material, 30 parts by weight of acetylene black as a conductive auxiliary agent and 10 parts by weight of a polyvinylidene fluoride resin as a binder were mixed together. The mixture was dispersed in dehydrated N-methyl-2-pyrrolidone to give a negative electrode material mixture in the form of a slurry. The negative electrode material mixture was applied onto a surface of a negative electrode current collector composed of a 15 μm thick aluminum foil. The negative electrode current collector coated with the negative electrode material mixture was dried and rolled. A negative electrode plate was thus obtained.

(iv) Fabrication of Sheet-Type Batteries

Sheet-type sodium secondary batteries of Example 3-1 and Comparative Example 3-1 were fabricated in the same manner as in Examples 2-1 to 2-3.

[Charge/discharge Test at Constant Current]

Figure 8:
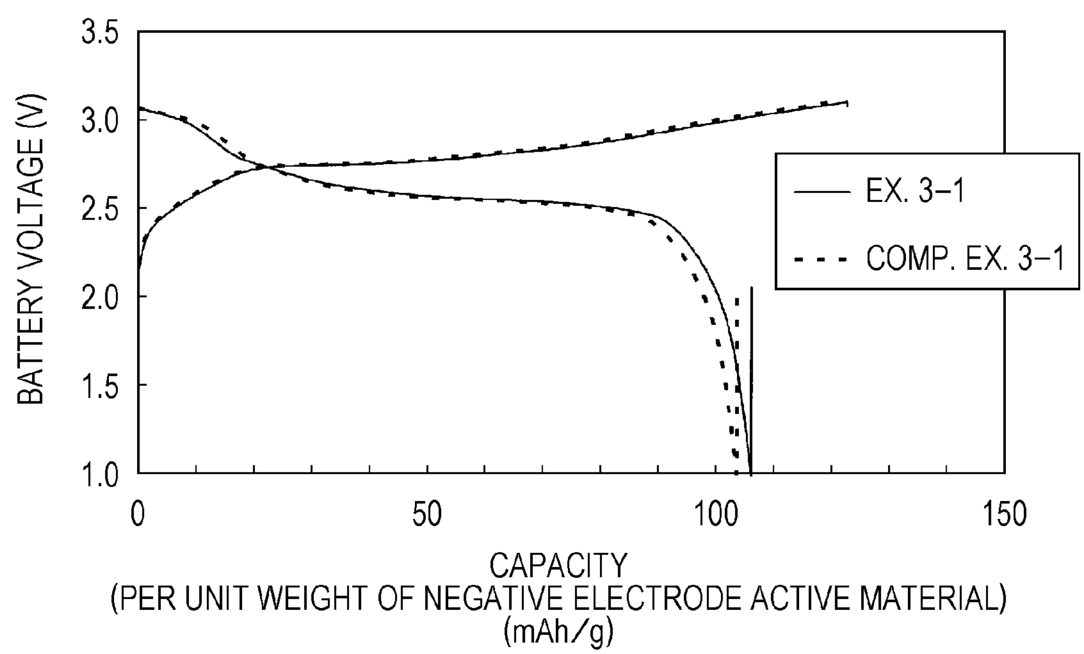
FIG. 8 is a diagram illustrating charge/discharge curves obtained in a third cycle in a charge/discharge test with respect to sodium secondary batteries in Example 3-1 and Comparative Example 3-1.

The sodium secondary batteries of Example 3-1 and Comparative Example 3-1 were subjected to a charge/discharge test under the same conditions as in Examples 2-1 to 2-3 and Comparative Example 2-1. The cut-off voltage in the constant-current charging was set at 3.1 V. FIG. 8 illustrates charge/discharge curves obtained in the third cycle. In FIG. 8, the horizontal axis indicates the capacity per unit weight of the negative electrode active material. The discharge capacities in the third cycle are described in Table 4. Here, the discharge capacities per unit weight of the negative electrode active material are shown.

TABLE 4

| | Compositions of solvents | Discharge capacities in third cycle (per unit weight of negative electrode active material) [mAh/g] |
|---|---|---|
| Ex. 3-1 | FEC + FEA (25:75) | 106 |
| Comp. Ex. 3-1 | FEC + DEC (25:75) | 104 |

The battery of Example 3-1 exhibited a larger discharge capacity than the battery of Comparative Example 3-1. With the positive electrode having a potential of 3.1 V based on Na, it is considered that the electrolytic solution used in the battery of Comparative Example 3-1 was not oxidatively decomposed. Thus, the difference in discharge capacity between the batteries of Example 3-1 and Comparative Example 3-1 was not ascribed to the difference in oxidation resistance between the electrolytic solutions therein. The reason for the result that the battery of Example 3-1 outperformed the battery of Comparative Example 3-1 in terms of discharge capacity is not clear. It is, however, assumed that a passive state film formed on the negative electrode of Example 3-1 had a lower resistance than the film formed on the negative electrode of Comparative Example 3-1 and consequently sodium ions were inserted in the negative electrode and were released therefrom in an accelerated manner.

Experiment 4

Next, solvents of Reference Examples 4-1 to 4-23 and Comparative Examples 4-1 to 4-3 were studied to determine their capability of dissolving sodium metal.

Reference Example 4-1

1 mL of 2,2,2-trifluoroethyl acetate (FEA) was provided.

Reference Example 4-2

1 mL of a mixed solvent obtained by mixing fluoroethylene carbonate (FEC) (CAS No.: 114435-02-8) and FEA with a volume ratio of 10:90 was provided.

Reference Example 4-3

1 mL of a mixed solvent obtained by mixing FEC and FEA with a volume ratio of 20:80 was provided.

Reference Example 4-4

1 mL of a mixed solvent obtained by mixing FEC and FEA with a volume ratio of 30:70 was provided.

Reference Example 4-5

1 mL of a mixed solvent obtained by mixing FEC and FEA with a volume ratio of 40:60 was provided.

Reference Example 4-6

1 mL of methyl 3,3,3-trifluoropropionate (FMP) (CAS No.: 18830-44-9) was provided.

Reference Example 4-7

1 mL of a mixed solvent obtained by mixing FEC and FMP with a volume ratio of 30:70 was provided.

Reference Example 4-8

1 mL of a mixed solvent obtained by mixing propylene carbonate (PC) (CAS No.: 180-32-7) and FEA with a volume ratio of 10:90 was provided.

Reference Example 4-9

1 mL of a mixed solvent obtained by mixing PC and FEA with a volume ratio of 20:80 was provided.

Reference Example 4-10

1 mL of a mixed solvent obtained by mixing PC and FEA with a volume ratio of 30:70 was provided.

Reference Example 4-11

1 mL of a mixed solvent obtained by mixing PC and FEA with a volume ratio of 40:60 was provided.

Reference Example 4-12

1 mL of a mixed solvent obtained by mixing PC and FEA with a volume ratio of 50:50 was provided.

Reference Example 4-13

1 mL of a mixed solvent obtained by mixing PC and FEA with a volume ratio of 60:40 was provided.

Reference Example 4-14

1 mL of a mixed solvent obtained by mixing PC and FEA with a volume ratio of 70:30 was provided.

Reference Example 4-15

1 mL of a mixed solvent obtained by mixing PC and FEA with a volume ratio of 80:20 was provided.

Reference Example 4-16

1 mL of a mixed solvent obtained by mixing PC and FEA with a volume ratio of 90:10 was provided.

Reference Example 4-17

1 mL of a mixed solvent obtained by mixing dimethyl carbonate (DMC) (CAS No.: 616-38-6) and FEA with a volume ratio of 30:70 was provided.

Reference Example 4-18

1 mL of a mixed solvent obtained by mixing DMC and FEA with a volume ratio of 40:60 was provided.

Reference Example 4-19

1 mL of a mixed solvent obtained by mixing DMC and FEA with a volume ratio of 50:50 was provided.

Reference Example 4-20

1 mL of a mixed solvent obtained by mixing DMC and FEA with a volume ratio of 60:40 was provided.

Reference Example 4-21

1 mL of a mixed solvent obtained by mixing DMC and FEA with a volume ratio of 70:30 was provided.

Reference Example 4-22

1 mL of a mixed solvent obtained by mixing DMC and FEA with a volume ratio of 80:20 was provided.

Reference Example 4-23

1 mL of a mixed solvent obtained by mixing DMC and FEA with a volume ratio of 90:10 was provided.

Comparative Example 4-1

1 mL of FEC was provided.

Comparative Example 4-2

1 mL of DMC was provided.

Comparative Example 4-3

1 mL of methyl propionate (MP) (CAS No.: 554-12-1) was provided.

[Evaluation of Capability of Dissolving Sodium Metal]

Square sodium metal foils having a width of approximately 5 mm and a thickness of approximately 300 μm were added to the solvents prepared above, and then were allowed to stand at room temperature to determine the capability of the solvents of dissolving sodium metal. Specifically, the dissolution of sodium metal was visually examined after 10 seconds, 1 hour, 24 hours or 60 hours after the addition of sodium metal to the solvents of Reference Examples 4-1 to 4-23 and Comparative Examples 4-1 to 4-3. Whether the sodium metal had been dissolved or not was evaluated based on the presence or absence of a change in the color of the solvent. The results are described in Tables 5, 6 and 7.

TABLE 5

| | Compositions of solvents | Volume fractions of fluorinated chain carboxylic acid esters (%) | Na metal after 10 seconds | Na metal after 1 hour | Na metal after 60 hours |
|---|---|---|---|---|---|
| Ref. Ex. 4-1 | FEA | 100 | Dissolved | Dissolved | Dissolved |
| Ref. Ex. 4-2 | FEC + FEA (10:90) | 90 | Dissolved | Dissolved | Dissolved |
| Ref. Ex. 4-3 | FEC + FEA (20:80) | 80 | No change | Dissolved | Dissolved |
| Ref. Ex. 4-4 | FEC + FEA (30:70) | 70 | No change | Dissolved | Dissolved |
| Ref. Ex. 4-5 | FEC + FEA (40:60) | 60 | No change | No change | Dissolved |
| Ref. Ex. 4-6 | FMP | 100 | Dissolved | Dissolved | Dissolved |
| Ref. Ex. 4-7 | FEC + FMP (30:70) | 70 | No change | Dissolved | Dissolved |
| Comp. Ex. 4-1 | FEC | 0 | No change | No change | No change |
| Comp. Ex. 4-2 | DMC | 0 | No change | No change | No change |
| Comp. Ex. 4-3 | MP | 0 | No change | No change | No change |

TABLE 6

| | Compositions of solvents | Volume fractions of fluorinated chain carboxylic acid esters (%) | Na metal after 10 seconds | Na metal after 1 hour | Na metal after 24 hours |
|---|---|---|---|---|---|
| Ref. Ex. 4-8 | PC + FEA (10:90) | 90 | Dissolved | Dissolved | Dissolved |

TABLE 6-continued

| | Compositions of solvents | Volume fractions of fluorinated chain carboxylic acid esters (%) | Na metal after 10 seconds | Na metal after 1 hour | Na metal after 24 hours |
|---|---|---|---|---|---|
| Ref. Ex. 4-9 | PC + FEA (20:80) | 80 | Dissolved | Dissolved | Dissolved |
| Ref. Ex. 4-10 | PC + FEA (30:70) | 70 | Dissolved | Dissolved | Dissolved |
| Ref. Ex. 4-11 | PC + FEA (40:60) | 60 | Dissolved | Dissolved | Dissolved |
| Ref. Ex. 4-12 | PC + FEA (50:50) | 50 | Dissolved | Dissolved | Dissolved |
| Ref. Ex. 4-13 | PC + FEA (60:40) | 40 | No change | Dissolved | Dissolved |
| Ref. Ex. 4-14 | PC + FEA (70:30) | 30 | No change | Dissolved | Dissolved |
| Ref. Ex. 4-15 | PC + FEA (80:20) | 20 | No change | No change | Dissolved |
| Ref. Ex. 4-16 | PC + FEA (90:10) | 10 | No change | No change | Dissolved |

TABLE 7

| | Compositions of solvents | Volume fractions of fluorinated chain carboxylic acid esters (%) | Na metal after 10 seconds | Na metal after 1 hour | Na metal after 24 hours |
|---|---|---|---|---|---|
| Ref. Ex. 4-17 | DMC + FEA (30:70) | 70 | Dissolved | Dissolved | Dissolved |
| Ref. Ex. 4-18 | DMC + FEA (40:60) | 60 | Dissolved | Dissolved | Dissolved |
| Ref. Ex. 4-19 | DMC + FEA (50:50) | 50 | Dissolved | Dissolved | Dissolved |
| Ref. Ex. 4-20 | DMC + FEA (60:40) | 40 | No change | Dissolved | Dissolved |
| Ref. Ex. 4-21 | DMC + FEA (70:30) | 30 | No change | Dissolved | Dissolved |
| Ref. Ex. 4-22 | DMC + FEA (80:20) | 20 | No change | No change | Dissolved |
| Ref. Ex. 4-23 | DMC + FEA (90:10) | 10 | No change | No change | Dissolved |
| Comp. Ex. 4-2 | DMC | 0 | No change | No change | No change |

Referring to Table 5, the comparison of Reference Examples 4-1 to 4-7 with Comparative Examples 4-1 to 4-3 shows that the solvents including a fluoro group-containing chain carboxylic acid ester had a capability of dissolving sodium metal while the solvents free from fluoro group-containing chain carboxylic acid esters did not dissolve sodium metal.

As demonstrated in Reference Examples 4-1 to 4-5, the capability of dissolving sodium metal was higher with increasing content of the fluoro group-containing chain carboxylic acid ester in the solvent. In other words, it was visually confirmed that even when the content of the fluoro group-containing chain carboxylic acid ester in the solvent was low, the solvent showed the Na dissolving action by being allowed to stand for a prolonged time. A similar tendency was observed in Reference Examples 4-6 and 4-7.

Table 6 shows the results obtained when the solvents contained PC that was a fluoro-free cyclic ester carbonate. As demonstrated in Reference Examples 4-8 to 4-16, the capability of dissolving sodium metal was higher with increasing content of the fluoro group-containing chain carboxylic acid ester in the solvent. Specifically, sodium metal was dissolved within 1 hour in Reference Examples 4-8 to 4-14 in which the volume fraction of the fluoro group-containing chain carboxylic acid ester in the solvent was 30% or more. That is, the solvent exhibited a strong action in dissolving sodium metal when the solvent contained the fluoro group-containing chain carboxylic acid ester with a volume fraction of 30% or more. Further, sodium metal was dissolved within 10 seconds in Reference Examples 4-8 to 4-12 in which the volume fraction of the fluoro group-containing chain carboxylic acid ester in the solvent was 50% or more. That is, the solvent exhibited a very strong action in dissolving sodium metal when the solvent contained the fluoro group-containing chain carboxylic acid ester with a volume fraction of 50% or more.

Table 7 shows the results obtained when the solvents contained DMC that was a fluoro-free chain ester carbonate. Referring to Table 7, the comparison of Reference Examples 4-17 to 4-23 with Comparative Example 4-2 shows that the solvents including a fluoro group-containing chain carboxylic acid ester had a capability of dissolving sodium metal while the solvent free from fluoro group-containing chain carboxylic acid esters did not dissolve sodium metal. As demonstrated in Reference Examples 4-17 to 4-23, the capability of dissolving sodium metal was higher with increasing content of the fluoro group-containing chain carboxylic acid ester in the solvent. Specifically, sodium metal was dissolved within 1 hour in Reference Examples 4-17 to 4-21 in which the volume fraction of the fluoro group-containing chain carboxylic acid ester in the solvent was 30% or more. That is, the solvent exhibited a strong action in dissolving sodium metal when the solvent contained the fluoro group-containing chain carboxylic acid ester with a volume fraction of 30% or more. Further, sodium metal was dissolved within 10 seconds in Reference Examples 4-17 to 4-19 in which the volume fraction of the fluoro group-containing chain carboxylic acid ester in the solvent was 50% or more. That is, the solvent exhibited a very strong action in dissolving sodium metal when the solvent contained the fluoro group-containing chain carboxylic acid ester with a volume fraction of 50% or more.

Experiments 1 to 4 have shown the following facts. Since the non-aqueous electrolytic solutions for sodium secondary batteries according to the disclosed embodiment have excellent oxidation resistance, the solutions can be stable on positive electrodes even when the potential of the electrodes reach a high potential during charging. The non-aqueous electrolytic solutions for sodium secondary batteries according to the disclosed embodiment can be also stable on negative electrodes that are charged to a low potential. With the electrolytic solutions being resistant to decomposition on positive electrodes and negative electrodes, the sodium secondary batteries according to the disclosed embodiment can exhibit high durability during charging. Further, the non-aqueous electrolytic solutions for sodium secondary batteries according to the reference embodiment can suppress the deposition of sodium metal on negative electrodes. Thus, the sodium secondary batteries according to the disclosed embodiment can reduce the risk that sodium metal is deposited on the electrode to form internal short circuits. This can ensure high safety of the batteries. Furthermore, the non-aqueous electrolytic solutions for sodium secondary batteries according to the disclosed embodiment have an additional advantage that the toxicity is low compared to nitrile group-containing organic solvents.

Experiment 5

LSV (linear sweep voltammetry) measurement was carried out on electrolytic solutions of Reference Examples 5-1 to 5-8 and Comparative Examples 5-1 and 5-2, thereby studying the oxidation resistance of the electrolytic solutions.

Reference Example 5-1

The electrolytic solution of Reference Example 5-1 was obtained by dissolving $NaPF_6$ (CAS No.: 21324-39-0) in a mixed solvent (weight ratio 30:70) of fluoroethylene carbonate (FEC) (CAS No.: 114435-02-8) and dimethyl carbonate (DMC) (CAS No.: 616-38-6), with a concentration of 0.1 mol/L. The content of the fluoro group-containing ester carbonate in the solvent was 30 wt %.

Reference Example 5-2

The electrolytic solution of Reference Example 5-2 was obtained by dissolving $NaPF_6$ in a mixed solvent (weight ratio 50:50) of FEC and DMC, with a concentration of 0.1 mol/L. The content of the fluoro group-containing ester carbonate in the solvent was 50 wt %.

Reference Example 5-3

The electrolytic solution of Reference Example 5-3 was obtained by dissolving $NaPF_6$ in a mixed solvent (weight ratio 80:20) of FEC and DMC, with a concentration of 0.1 mol/L. The content of the fluoro group-containing ester carbonate in the solvent was 80 wt %.

Reference Example 5-4

The electrolytic solution of Reference Example 5-4 was obtained by dissolving $NaPF_6$ in FEC with a concentration of 0.1 mol/L. The content of the fluoro group-containing ester carbonate in the solvent was 100 wt %.

Reference Example 5-5

The electrolytic solution of Reference Example 5-5 was obtained by dissolving $NaPF_6$ in a mixed solvent (weight ratio 30:70) of 3,3,3-trifluoropropylene carbonate (FPC) and DMC, with a concentration of 0.1 mol/L. The content of the fluoro group-containing ester carbonate in the solvent was 30 wt %.

Reference Example 5-6

The electrolytic solution of Reference Example 5-6 was obtained by dissolving $NaPF_6$ in a mixed solvent (weight ratio 30:70) of (2,2,2-trifluoroethyl)methyl carbonate (FEMC) (CAS No.: 156783-95-8) and DMC, with a concentration of 0.1 mol/L. The content of the fluoro group-containing ester carbonate in the solvent was 30 wt %.

Reference Example 5-7

The electrolytic solution of Reference Example 5-7 was obtained by dissolving $NaPF_6$ in a mixed solvent (weight ratio 20:10:70) of FEC, FEMC and DMC, with a concentration of 0.1 mol/L. The content of the fluoro group-containing ester carbonates in the solvent was 30 wt %.

Reference Example 5-8

The electrolytic solution of Reference Example 5-8 was obtained by dissolving $NaPF_6$ in a mixed solvent (weight ratio 30:70) of FEC and FEMC, with a concentration of 0.1 mol/L. The content of the fluoro group-containing ester carbonates in the solvent was 100 wt %.

Comparative Example 5-1

The electrolytic solution of Comparative Example 5-1 was obtained by dissolving $NaPF_6$ in a mixed solvent (weight ratio 30:70) of ethylene carbonate (EC) (CAS No.: 96-49-1) and DMC, with a concentration of 0.1 mol/L. The content of the fluoro group-containing ester carbonate in the solvent was 0 wt %.

Comparative Example 5-2

The electrolytic solution of Comparative Example 5-2 was obtained by dissolving $NaPF_6$ in a mixed solvent (weight ratio 20:80) of FEC and DMC, with a concentration of 0.1 mol/L. The content of the fluoro group-containing ester carbonate in the solvent was 20 wt %.

[Evaluation of Oxidation Resistance by LSV Measurement]

Figure 9:
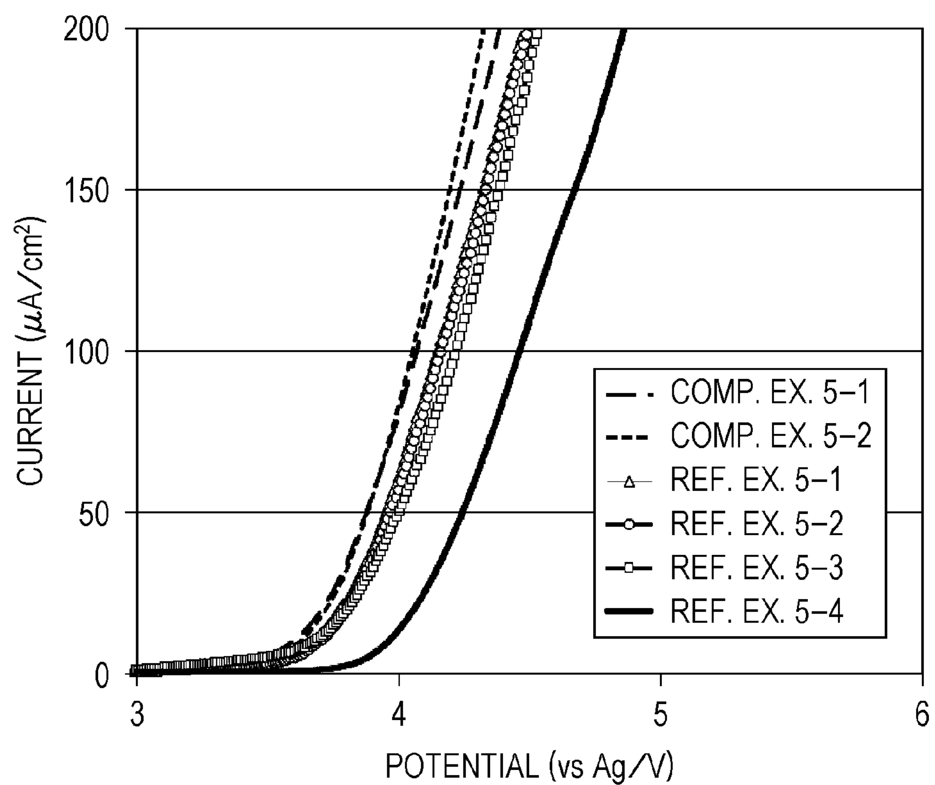
FIG. 9 is a diagram illustrating potential-current curves obtained by LSV measurement with respect to electrolytic solutions in Reference Examples 5-1 to 5-4, and Comparative Examples 5-1 and 5-2.
Figure 10:
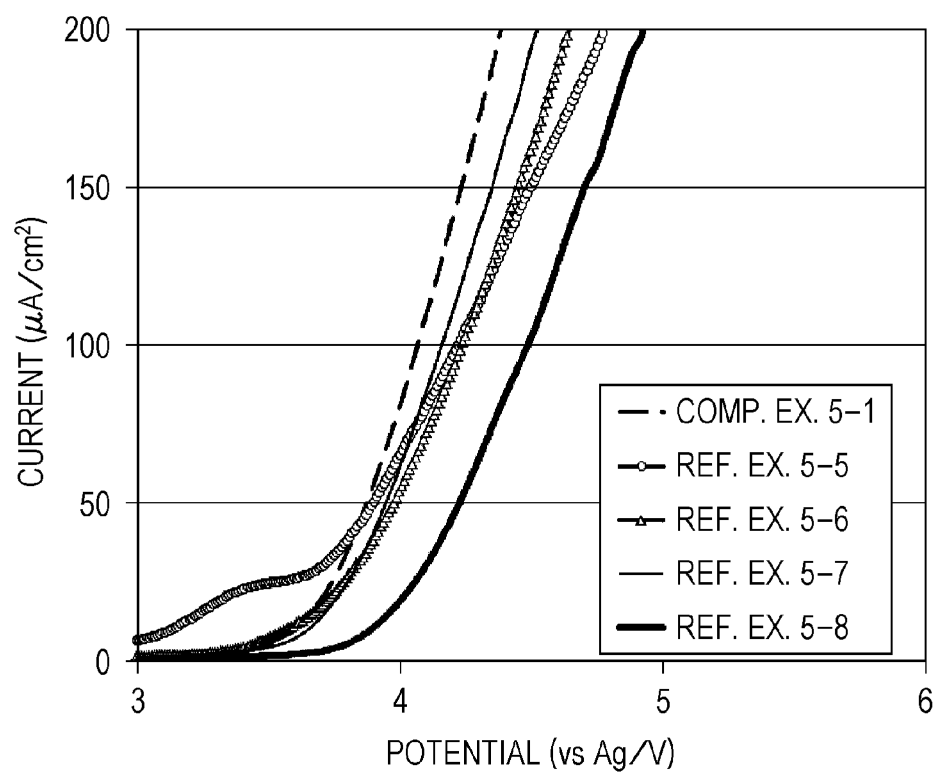
FIG. 10 is a diagram illustrating potential-current curves obtained by LSV measurement with respect to electrolytic solutions in Reference Examples 5-5 to 5-8 and Comparative Example 5-1.

LSV measurement was carried out on the non-aqueous electrolytic solutions for sodium secondary batteries prepared above (Reference Examples 5-1 to 5-8, and Comparative Examples 5-1 and 5-2). The measurement method was similar to that in Experiment 1. The results are shown in FIGS. 9 and 10. Table 6 describes the potentials of the working electrode obtained when the oxidation current density at the working electrode reached 100 $\mu A/cm^2$. In Experiment 5, the point where the oxidation current density reached 100 $\mu A/cm^2$ may be also written as "the oxidation current started to flow".

TABLE 8

| | Compositions of solvents | Contents of fluorinated ester carbonates (wt %) | Potentials (V) of working electrode at 100 $\mu A/cm^2$ |
|---|---|---|---|
| Ref. Ex. 5-1 | FEC + DMC (30:70) | 30 | 4.14 |
| Ref. Ex. 5-2 | FEC + DMC (50:50) | 50 | 4.15 |
| Ref. Ex. 5-3 | FEC + DMC (80:20) | 80 | 4.21 |
| Ref. Ex. 5-4 | FEC | 100 | 4.45 |
| Ref. Ex. 5-5 | FPC + DMC (30:70) | 30 | 4.21 |
| Ref. Ex. 5-6 | FEMC + DMC (30:70) | 30 | 4.16 |
| Ref. Ex. 5-7 | FEC + FEMC + DMC (20:10:70) | 30 | 4.15 |
| Ref. Ex. 5-8 | FEC + FEMC (30:70) | 100 | 4.48 |
| Comp. Ex. 5-1 | EC + DMC (20:80) | 0 | 4.06 |
| Comp. Ex. 5-2 | FEC + DMC (20:80) | 20 | 4.04 |

From the comparison of the results of Reference Examples 5-1 to 5-8 with the results of Comparative Examples 5-1 and 5-2, as illustrated in FIGS. 9 and 10, the oxidation current started to flow at a higher potential in Reference Examples than in Comparative Examples. These results mean that the non-aqueous electrolytic solutions of Reference Examples have higher oxidation resistance than the non-aqueous electrolytic solutions of Comparative Examples. As shown in Table 8, the effect in enhancing the oxidation resistance was obtained when the content of the fluoro group-containing ester carbonate was 30 wt % or more (see, for example, Reference Example 5-1 and Comparative Example 5-2). As shown by the results of Reference Examples 5-1 to 5-4, the non-aqueous electrolytic solution containing 100 wt % of the fluoro group-containing ester carbonate exhibited higher oxidation resistance than when the content of the fluoro group-containing ester carbonate was 80 wt % or less.

Experiment 6

Next, properties of sodium secondary batteries of Reference Examples 6-1 and 6-2, and Comparative Example 6-1 were studied by a charge/discharge test at a constant current value, and also by an overcharge test.

Reference Examples 6-1 and 6-2, and Comparative Example 6-1

First, sodium secondary batteries of Reference Examples 6-1 and 6-2, and Comparative Example 6-1 were fabricated in the following manner.

The battery of Reference Example 6-1 involved an electrolytic solution which had the same composition as that of the electrolytic solution in Reference Example 5-1, except that the concentration of $NaPF_6$ was changed to 1.0 mol/L. The battery of Reference Example 6-2 involved an electrolytic solution which had the same composition as that of the electrolytic solution in Reference Example 5-8, except that the concentration of $NaPF_6$ was changed to 1.0 mol/L. The battery of Comparative Example 6-1 involved an electrolytic solution which had the same composition as that of the electrolytic solution in Comparative Example 5-1, except that the concentration of $NaPF_6$ was changed to 1.0 mol/L.

The batteries fabricated here were sheet-type batteries similar to the batteries in Examples 2-1 to 2-3, having the same positive electrodes and negative electrodes except that the compositions of the electrolytic solutions were different.

[Charge/discharge Test at Constant Current]

Figure 11:
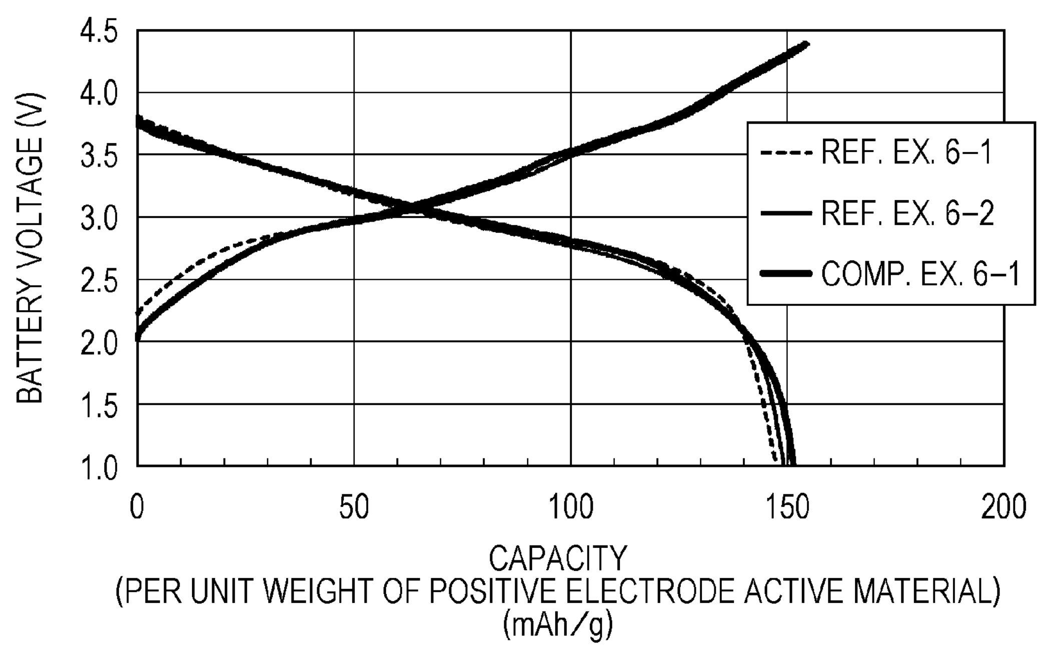
FIG. 11 is a diagram illustrating charge/discharge curves obtained in a third cycle in a charge/discharge test with respect to sodium secondary batteries in Reference Examples 6-1 and 6-2, and Comparative Example 6-1.

Properties of the sodium secondary batteries of Reference Examples 6-1 and 6-2, and Comparative Example 6-1 were studied by a charge/discharge test at a constant current value. The method of the charge/discharge test was similar to that described in Experiment 2, except that the constant-current charging was performed until the voltage of the battery reached 4.4 V. FIG. 11 illustrates charge/discharge curves obtained in the third cycle. In FIG. 11, the horizontal axis indicates the capacity per unit weight of the positive electrode active material. The discharge efficiencies in the third cycle are described in Table 9. Here, the term "discharge efficiencies in the third cycle" indicates the ratios of the discharge capacity in the third cycle to the charge capacity in the third cycle.

TABLE 9

| | Compositions of solvents | Contents of fluorinated ester carbonates (wt %) | Discharge efficiencies in third cycle (%) |
|---|---|---|---|
| Ref. Ex. 6-1 | FEC + DMC (30:70) | 30 | 98.6 |
| Ref. Ex. 6-2 | FEC + FEMC (30:70) | 100 | 97 3 |
| Comp. Ex. 6-1 | EC + DMC (30:70) | 0 | 96.8 |

As compared to the battery of Comparative Example 6-1, the sodium secondary batteries of Reference Examples 6-1 and 6-2 exhibited higher ratios of discharge capacity to charge capacity, or higher discharge efficiencies. These results are probably ascribed to the excellent oxidation resistance of the electrolytic solutions used in the batteries of Reference Examples 6-1 and 6-2. Specifically, it is probable that the electrolytic solutions in Reference Examples 6-1 and 6-2 were stable on the positive electrode even when the electrode potential reached a high potential during charging and consequently side reactions on the surface of the positive electrode were suppressed.

[Overcharge Test]

The sodium secondary batteries of Reference Examples 6-1 and 6-2, and Comparative Example 6-1 were, after the three cycles of charging and discharging, charged at a current density of 0.1 $mA/cm^2$ until the voltage of the batteries reached 4.7 V. The overcharged batteries were decomposed in an argon atmosphere, and then the negative electrodes were visually observed. The results are described in Table 10.

TABLE 10

| | Changes |
|---|---|
| Ref. Ex. 6-1 | Sodium metal deposited on negative electrode |
| Ref. Ex. 6-2 | No deposits on negative electrode |
| Comp. Ex. 6-1 | Sodium metal deposited on negative electrode |

As described in Table 10, overcharging of the batteries of Reference Example 6-1 and Comparative Example 6-1 resulted in the deposition of sodium metal on the negative electrode. In contrast, as described in Table 10, sodium metal was not deposited on the negative electrode during the overcharging of the battery of Reference Example 6-2. As already described, the reasons for these results are probably because the fluoro group-containing chain ester carbonates have high reactivity with respect to sodium metal and can dissolve sodium metal. The deposition of sodium metal on negative electrodes may cause internal short circuits and may lower the safety of batteries. Thus, the use of fluoro group-containing chain ester carbonates in electrolytic solutions will enhance the safety of sodium secondary batteries.

In the case where negative electrode active materials contain sodium metal, the fluoro group-containing chain ester carbonates may dissolve the negative electrode active materials to degrade the performance of the negative electrodes. On the other hand, the negative electrode active material in the battery of Reference Example 6-2 is a carbon material. Thus, the performance of the negative electrode in the battery of Reference Example 6-2 is hardly degraded in spite of the fact that the electrolytic solution contains a fluoro group-containing chain ester carbonate. The safety of sodium secondary batteries will be further enhanced with the electrolytic solution containing a fluoro group-containing ester carbonate and the negative electrode active material free from sodium metal (for example, carbon or a metal oxide).

Experiment 7

Next, properties of sodium secondary batteries of Reference Example 7-1 and Comparative Example 7-1 were studied by a charge/discharge test at a constant current value.

Reference Example 7-1 and Comparative Example 7-1

First, sodium secondary batteries of Reference Example 7-1 and Comparative Example 7-1 were fabricated in the following manner.

The electrolytic solution in Reference Example 6-2 was used for the battery of Reference Example 7-1. The electrolytic solution in Comparative Example 6-1 was used for the battery of Comparative Example 7-1.

The batteries fabricated here were sheet-type batteries similar to the batteries in Example 3-1 and Comparative Example 3-1, having the same positive electrodes and negative electrodes except that the compositions of the electrolytic solutions were different.

[Charge/discharge Test at Constant Current]

Figure 12:
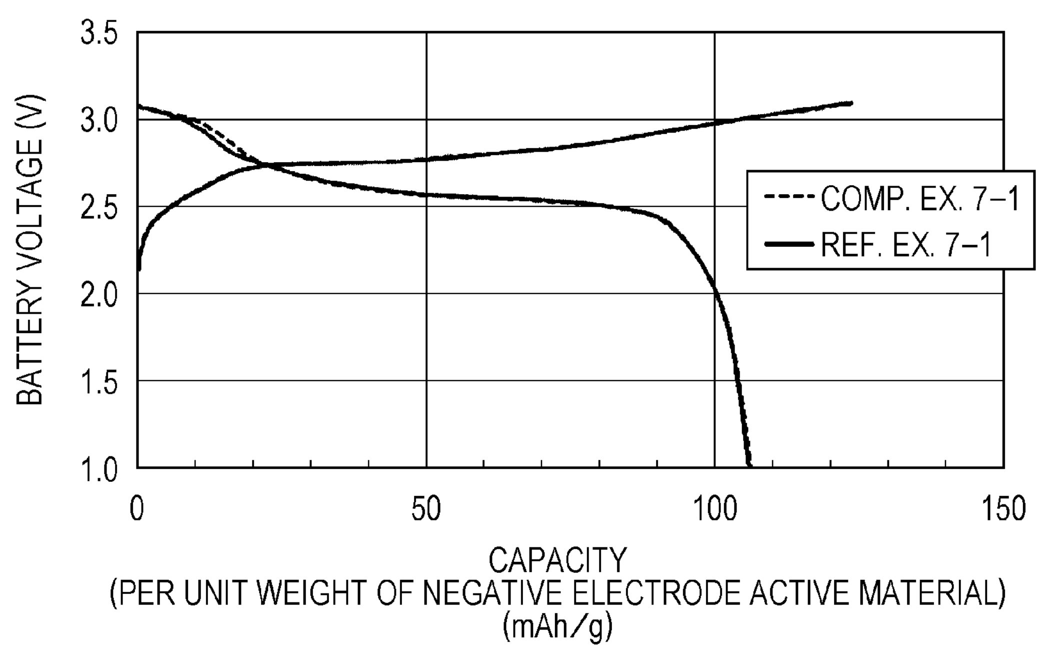
FIG. 12 is a diagram illustrating charge/discharge curves obtained in a third cycle in a charge/discharge test with respect to sodium secondary batteries in Reference Example 7-1 and Comparative Example 7-1.

The sodium secondary batteries of Reference Example 7-1 and Comparative Example 7-1 were subjected to a charge/discharge test under the same conditions as in Reference Examples 6-1 and 6-2, and Comparative Example 6-1. The cut-off voltage in the constant-current charging was set at 3.1 V. FIG. 12 illustrates charge/discharge curves obtained in the third cycle. In FIG. 12, the horizontal axis indicates the capacity per unit weight of the negative electrode active material. The discharge efficiencies in the third cycle are described in Table 11.

TABLE 11

| | Compositions of solvents | Contents of fluorinated ester carbonates (wt %) | Discharge efficiencies in third cycle (%) |
|---|---|---|---|
| Ref. Ex. 7-1 | FEC + FEMC (30:70) | 100 | 86.4 |
| Comp. Ex. 7-1 | EC + DMC (30:70) | 0 | 86.2 |

During the charging of the batteries of Reference Example 7-1 and Comparative Example 7-1, the potential of the positive electrode reaches 3.1 V based on Na and the potential of the negative electrode reaches 0.0 V based on Na. The discharge efficiencies in the third cycle of the batteries of Reference Example 7-1 and Comparative Example 7-1 were approximately 86%. That is, the batteries of Reference Example 7-1 and Comparative Example 7-1 exhibited a similar discharge capacity. In the batteries of Reference Example 7-1 and Comparative Example 7-1, the potential of the positive electrode is as low as 3.1 V or less, and thus there is substantially no oxidative decomposition of the electrolytic solution. It is therefore considered that the oxidation resistance of electrolytic solutions does not affect the discharge efficiency.

The discharge efficiencies in Reference Example 7-1 and Comparative Example 7-1 were almost equal, or a slightly higher discharge efficiency was obtained in Reference Example 7-1. Thus, it is considered that the electrolytic solution of Reference Example 7-1 has equal or higher stability on the negative electrode than the electrolytic solution in Comparative Example 7-1.

Experiments 5 to 7 have shown the following facts. Since the non-aqueous electrolytic solutions for sodium secondary batteries according to the reference embodiment have excellent oxidation resistance, the solutions can be stable on positive electrodes even when the potential of the electrodes reach a high potential during charging. With the non-aqueous electrolytic solutions for sodium secondary batteries according to the reference embodiment being resistant to decomposition on positive electrodes, the sodium secondary batteries according to the reference embodiment can exhibit high durability during charging. Further, the non-aqueous electrolytic solutions for sodium secondary batteries according to the reference embodiment can suppress the deposition of sodium metal on negative electrodes. Thus, the sodium secondary batteries according to the reference embodiment can reduce the risk that sodium metal is deposited on the electrode to form internal short circuits. This can ensure high safety of the batteries. Furthermore, the non-aqueous electrolytic solutions for sodium secondary batteries according to the reference embodiment have an additional advantage that the toxicity is low compared to nitrile group-containing organic solvents.

The sodium secondary batteries according to the present disclosure may be used in, for example, EV and PHEV.

What is claimed is:

1. A sodium secondary battery comprising:

a positive electrode including a positive electrode active material allowing a sodium ion to be inserted therein and released therefrom;

a negative electrode including a negative electrode active material allowing a sodium ion to be inserted therein and released therefrom; and a non-aqueous electrolytic solution including a non-aqueous solvent and a sodium salt dissolved in the non-aqueous solvent, the non-aqueous solvent including a fluoro group-containing chain carboxylic acid ester represented by General Formula (1):

(1)

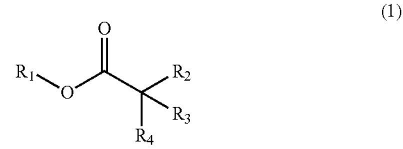

wherein $R_1$ is an aromatic group, an unsaturated aliphatic group or a saturated aliphatic group; $R_2$, $R_3$ and $R_4$ are each a hydrogen atom, an aromatic group, an unsaturated aliphatic group or a saturated aliphatic group; and at least one of $R_1$, $R_2$, $R_3$ and $R_4$ includes one or more fluoro groups.

2. The sodium secondary battery according to claim 1, wherein the chain carboxylic acid ester is at least one selected from the group consisting of fluoromethyl acetate, difluoromethyl acetate, trifluoromethyl acetate, methyl 3-fluoropropionate, methyl 3,3-difluoropropionate, methyl 3,3,3-trifluoropropionate, methyl 3-fluoro-2-methylpropionate, methyl 3,3-difluoro-2-methylpropionate, methyl 3,3,3-trifluoro-2-methylpropionate, methyl 3,3,3-trifluoro-2,2-dimethylpropionate, fluoromethyl propionate, difluoromethyl propionate, trifluoromethyl propionate, fluoromethyl 3-fluoropropionate, trifluoromethyl 3,3,3-trifluoropropionate, 2-fluoroethyl acetate, 2,2-difluoroethyl acetate, 2,2,2-trifluoroethyl acetate, 1-fluoroethyl acetate, 1,1-difluoroethyl acetate, 1,1,2,2,2-pentafluoroethyl acetate, 2-fluoroethyl propionate, 2,2-difluoroethyl propionate, 2,2,2-trifluoroethyl propionate, 1-fluoroethyl propionate, 1,1-difluoroethyl propionate, 1,1,2,2,2-pentafluoroethyl propionate, ethyl 3-fluoropropionate, ethyl 3,3-difluoropropionate, ethyl 3,3,3-trifluoropropionate, 2,2,2-trifluoroethyl 3,3,3-trifluoropropionate, 1,1,2,2,2-pentafluoroethyl 3,3,3-trifluoropropionate and 2-fluoroethyl 3-fluoropropionate.

3. The sodium secondary battery according to claim 1, wherein the chain carboxylic acid ester is at least one selected from the group consisting of 2,2,2-trifluoroethyl acetate and methyl 3,3,3-trifluoropropionate.

4. The sodium secondary battery according to claim 1, wherein the non-aqueous solvent includes the fluoro group-containing chain carboxylic acid ester in a volume fraction of not less than 30% of the non-aqueous solvent.

5. The sodium secondary battery according to claim 1, wherein the non-aqueous solvent includes the fluoro group-containing chain carboxylic acid ester in a volume fraction of not less than 50% of the non-aqueous solvent.

6. The sodium secondary battery according to claim 1, wherein the non-aqueous solvent further includes an ester carbonate.

7. The sodium secondary battery according to claim 6, wherein the ester carbonate is a cyclic ester carbonate.

8. The sodium secondary battery according to claim 7, wherein the cyclic ester carbonate is a fluoroethylene carbonate.

9. The sodium secondary battery according to claim 1, wherein the sodium salt is at least one selected from the group consisting of $NaBF_4$, $NaPF_6$, $NaN(SO_2CF_3)_2$ and $NaN(SO_2F)_2$.

10. The sodium secondary battery according to claim 1, wherein the negative electrode active material is a metal oxide.

11. The sodium secondary battery according to claim 10, wherein the metal oxide is titanium oxide.

12. The sodium secondary battery according to claim 1, wherein the negative electrode active material is carbon.

13. The sodium secondary battery according to claim 12, wherein the carbon is amorphous carbon.

14. The sodium secondary battery according to claim 1, wherein the potential of the positive electrode versus sodium metal reaches 3.9 V or more during charging of the sodium secondary battery.

15. The sodium secondary battery according to claim 1, wherein the one or more fluoro groups is not directly bonded to an α-carbon atom of a carbonyl group contained in the fluoro group-containing chain carboxylic acid ester.

* * * * *